United States Patent [19]

Niwano et al.

[11] Patent Number: 5,376,730
[45] Date of Patent: Dec. 27, 1994

[54] THERMOPLASTIC GRAFT COPOLYMER AND PROCESS FOR PREPARING THE SAME

[75] Inventors: Masahiro Niwano; Kenji Manabe; Ichiki Murase; Makoto Namioka; Nobuko Nakayama, all of Tsukuba, Japan

[73] Assignee: Sumitomo Chemical Company, Limited, Osaka, Japank

[21] Appl. No.: 853,741
[22] PCT Filed: Dec. 6, 1990
[86] PCT No.: PCT/JP90/01592
§ 371 Date: Jun. 5, 1992
§ 102(e) Date: Jun. 5, 1992
[87] PCT Pub. No.: WO91/09074
PCT Pub. Date: Jun. 27, 1991

[30] Foreign Application Priority Data

Dec. 7, 1989 [JP] Japan .................. 1-320265
Apr. 16, 1990 [JP] Japan .................. 2-100796
Nov. 29, 1990 [JP] Japan .................. 2-334272

[51] Int. Cl.$^5$ .............................. C08F 8/00
[52] U.S. Cl. .................. 525/329.3; 525/330.3; 525/330.6; 525/330.8; 525/331.7; 525/332.8; 525/332.9; 525/333.1; 525/333.2; 525/333.7; 525/333.9; 525/343; 525/386
[58] Field of Search ............... 525/330.3, 330.6, 329.3, 525/330.8, 331.7, 332.8, 342.9, 333.1, 333.2, 333.7, 333.9, 343, 386

[56] References Cited

U.S. PATENT DOCUMENTS 4,217,430 8/1980 Starkweather, Jr. et al. .

FOREIGN PATENT DOCUMENTS 0268437 5/1988 European Pat. Off. .
0287233 10/1988 European Pat. Off. .
0331312 9/1989 European Pat. Off. .
59-193927 11/1984 Japan .

Primary Examiner—Bernard Lipman
Attorney, Agent, or Firm—Stevens, Davis, Miller & Mosher

[57] ABSTRACT

There are provided a thermoplastic graft copolymer comprising, as main chain, a polymer having a glass transition temperature of 10° C. or below and, as side chain, an aromatic oligomer having a flow temperature of 100° C. or above; and its preparation process, especially a process wherein an aromatic oligomer containing 50% or more of the structural units represented by the following formula (I):

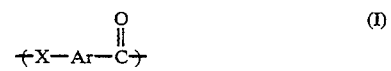

wherein X is O or S; and Ar is

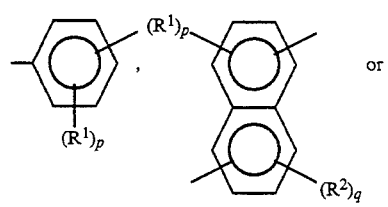

, or

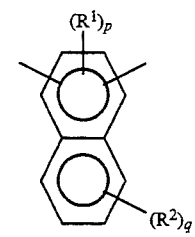

wherein $R^1$ and $R^2$ are alkyl group of 1–3 carbon atoms or phenyl group, and p and q are an integer of 0–2.

The graft copolymer of this invention can be used as a thermal resistant plastic elastomer for heat-resisting hoses, seals, automobile materials, etc.

31 Claims, No Drawings

THERMOPLASTIC GRAFT COPOLYMER AND PROCESS FOR PREPARING THE SAME

FIELD OF ART

This invention relates to a thermoplastic graft copolymer that can be used as a thermoplastic elastomer, especially the one required to have high thermal resistance for specific uses such as heat-resisting hoses, sealants and automobile materials, and a process for preparing such copolymer.

BACKGROUND ART

Presently, the industrially used thermoplastic elastomers (hereinafter abbreviated as TPE) are roughly divided in two types: TPE comprising a block copolymer consisting of soft segments and hard segments and TPE comprising a partially crosslinked rubber called elastomer alloy and a plastic phase-separated therefrom. As the former type of TPE, there are known a block copolymer consisting of segments of an aliphatic polyether such as polytetramethylene glycol and segments of a polyester such as polyethylene terephthalate and polybutylene terephthalate, which is called polyester elastomer, and a block copolymer consisting of segments of aliphatic polyether and segments of a polyamide such as polydodecanolactum, which is called polyamide elastomer. As the latter type of TPE, there is known, for instance, an elastomer alloy yielded from dynamic vulcanization of an alloy of polypropylene and ethylene-propylene-diene terpolymer.

European Patent laid-Open Specification 0287233 discloses preparation of a polymer solution for coating by using a copolymer having an aromatic polyester in the side chain, namely a copolymer having an aromatic polyester covalently bonded to an acrylic or polyester resin, and it is claimed that this polymer solution is capable of forming a coating film with high hardness. This patent specification, however, is silent on thermoplastic resin and TPE.

The TPE's comprising the block copolymers consisting of soft and hard segments are the relatively hard elastomers which are over 40 in D scale of Shore hardness. Also, these TPE's are subject to large compression set and not so high in thermal resistance.

On the other hand, the elastomer alloys are capable of forming soft elastomers of down to about 30 in A scale of Shore hardness, but they are poor in thermal resistance.

DISCLOSURE OF THE INVENTION

In view of these circumstances, the present inventors have pursued further studies and, as a result, discovered a thermoplastic graft copolymer comprising, as main chain, a polymer having a glass transition temperature of 10° C. or below and, as side chain, an aromatic oligomer having a flow temperature of 100° C. or above, and a process for preparing such graft copolymer. It was further found that said graft copolymer has the excellent properties as a thermoplastic elastomer, and these findings have led to the attainment of the present invention.

Further, as a result of strenuous studies, the present inventors unveiled a graft copolymer comprising as backbone a polymer having a glass transition temperature of 10° C. or below and as side chain an aromatic oligomer with a flow temperature of 100° C. or above, characterized in that the polymer having a glass transition temperature of 10° C. or below is partially crosslinked and that the obtained graft copolymer is capable of melt flow. It was also found that said graft copolymer has the excellent properties as a thermoplastic elastomer, and based on these findings, the present invention was completed.

The thermoplastic graft copolymer according to this invention is defined to be the one whose compression set after 22 hours at 70° C. (JIS K 6301) is less than 90%, Shore D hardness is below 50 and permanent set at 23° C. is less than 50%. It is especially preferred that ultimate elongation at 23° C. is greater than 100%.

The thermoplastic graft copolymer of this invention is further characterized in that it is insoluble in the good solvents of the polymer having a glass transition temperature of 10° C. or below constituting said graft copolymer.

Also, in the thermoplastic graft copolymer of this invention, the polymer having a glass transition temperature of 10° C. or below constituting said graft copolymer is preferably not a crystalline polymer.

The thermoplastic graft copolymer of this invention is also characterized in that it is physically crosslinked with the grafted aromatic oligomer.

The thermoplastic graft copolymer of this invention can be obtained by subjecting to graft reaction a polymer having a glass transition temperature of 10° C. or below, which forms the main chain, and an aromatic oligomer with a flow temperature of 100° C. or above, which forms the side chain. Preferably, the graft reaction is accomplished through melt mixing, followed by cooling.

The main chain polymer constituting the graft copolymer of this invention has a glass transition temperature of 10° C. or below, preferably 0° C. or below, more preferably −10° C. or below. The glass transition temperature referred to herein designate the secondary transition point at which endotherm is observed at a heating rate of 10° C./min by a differential scanning calorimeter (DSC). When the glass transition temperature (hereinafter abbreviated as Tg) of said main chain polymer exceeds 10° C., said graft copolymer becomes unable to show rubber elasticity in the working temperature range above ordinary temperature. As preferred examples of the main chain polymers having Tg of 10° C. or below constituting the graft copolymers according to this invention, there can be mentioned olefin polymers, conjugated diene polymers and vinyl polymers, namely, homopolymers and random copolymers such as acrylic ester polymers, styrene-butadiene copolymer and its hydrogenation product, styrene-isoprene copolymer and its hydrogenation product, polybutadiene, polyisoprene, ethylene-propylene copolymer, ethylene-propylene-diene terpolymer, acrylonitrile-butadiene copolymer and its hydrogenation product, polychloroprene, ethylene-acrylic ester copolymer, and chlorosulfonated polyethylene; organopolysiloxanes, polyphosphazene and the like. It is also possible to use the copolymers formed from the monomers composing said homopolymers or random copolymers and other copolymerizable monomers having unsaturated double bonds. In use of any of these copolymers, it needs to control the composition so that the copolymer used will have Tg of 10° C. or below.

Further, as the main chain polymer having Tg of 10° C. or below constituting the graft copolymer of this invention, there can be used polysiloxanes prepared by partially modifying organopolysiloxanes with a reactive functional group. Typical examples of the reactive functional group usable here are amino group, epoxy group and hydrogen atom bonded to silicon atom.

The side chain forming the structure of the graft copolymer of this invention is constituted by an aromatic oligomer having a flow temperature of 100° C. or above, preferably 150° C. or above, more preferably 170° C. or above. It is also desirable that the flow temperature of said aromatic oligomer does not exceed 400° C., preferably stays within the range of 150°–350° C., more preferably 170°–300° C.

This flow temperature represents the temperature at which the molten oligomer shows a melt viscosity of 48,000 poises when the melt is forced out from a nozzle at a heating rate of 4° C./min under a load of 100 kg/cm² by using a capillary rheometer having a nozzle of 1 mm in inner diameter and 10 mm in length. When the flow temperature of said aromatic oligomer is below 100° C., the temperature range in which the obtained graft copolymer shows rubber elasticity is narrowed, that is, the produced graft copolymer proves unsatisfactory in thermal resistance.

Further, in order to improve thermal stability of said aromatic oligomer and for making it sure to provide a graft copolymer with satisfactory rubber elasticity by forming physical crosslinkage, it is advisable to remove the remaining monomers and dimers by washing with a solvent.

The solvent used for said purpose is preferably a polar solvent which is inactive to the aromatic oligomer. Especially preferred is a solvent whose solubility parameter at 25° C. is 9.0–15.0. (The solubility parameter referred to herein is described in Encycl. Polym. Sci. Technol., 3, 833 (1965)).

The aromatic oligomer having a flow temperature of 100° C. or above constituting the side chain of the graft copolymer of this invention is an oligomer having a benzene ring in its main sequence, preferably an oligomer containing 50% by weight or more, preferably 60% by weight or more of the structural units represented by the following formula (I):

$$+X-Ar-\overset{O}{\underset{\|}{C}}+ \quad (I)$$

wherein X is selected from O and S; the structural units containing O and the structural units containing S may both be contained in one oligomer; Ar is selected from

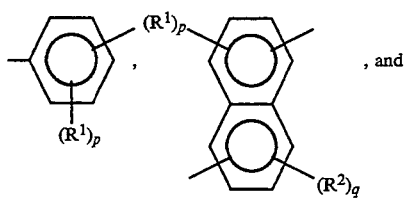, and

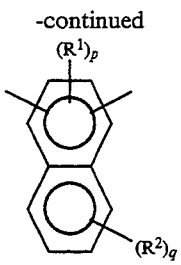

wherein $R^1$ and $R^2$ are each selected from $C_{1-3}$ alkyl group or phenyl group and may be the same or different, and different groups may be attached to one benzene ring; and p and q are each an integer of 0–2.

The number-average degree of polymerization of said oligomer is 2–10, preferably 3–8, more preferably 4–7.

The number-average molecular weight of said oligomer is preferably in the range of 300–1,500, more preferably 400–1,000. When the number-average molecular weight is less than 300, said oligmer becomes susceptible to thermal decomposition and also its flow temperature lowers notably, resulting in deteriorated thermal resistance of the produced graft copolymer. On the other hand, when the number-average molecular weight exceeds 1,500, the flow temperature comes close to the thermal decomposition temperature of said oligomer, which adversely affects moldability of the obtained graft copolymer.

Said oligomer may contain a structure formed by polycondensation of a monomer such as hydroxyalkylcarboxylic acid, aminoalkylcarboxylic acid, aminoarylcarboxylic acid or the like or a structure formed by condensation of a monofunctional carboxylic acid compound, phenolic compound or amino compound, for controlling the properties such as melting point of said oligomer.

The thermoplastic graft copolymer according to this invention is usable as a thermoplastic elastomer which exhibits rubber elasticity in a wide temperature range above the glass transition temperature.

It is considered that the repeating units (I) of said aromatic oligomer function as hard segments in the obtained graft copolymer to form a microdomain structure and serve for physical crosslinkage.

The usefulness of the thus obtained graft copolymer of this invention as a thermoplastic elastomer with excellent thermal resistance is supposed attributable to the above-said reasons. This supposition, however, is in no way restrictive on the concept of the present invention.

Further, in case the polymer having Tg of 10° C. or below constituting the graft copolymer of this invention is partially crosslinked by covalent bonding, the graft copolymer, assuming a three-dimensional network structure, shows excellent rubber elasticity in a wide temperature range above room temperature, and also its use as a thermoplastic elastomer is made possible by adjusting the degree of crosslinkage such as to allow melt flow of the copolymer.

The "melt flow" referred to herein indicates that the melt index of the graft copolymer, as measured at a temperature 40°–100° C. higher than flow temperature of the aromatic oligomer used and under a load of 10 kg, is 0.1 g/10 min or above. When the melt index measured under said conditions is less than 0.1 g/10 min, melt molding becomes difficult to carry out. Said graft copolymer shows the properties of a thermoplastic elastomer either when the graft copolymer is in single form or when it is mixed with a polymer having Tg of 10° C. or below, which may be the same as or different from the main chain polymer of said graft copolymer and/or an oligomer same as that constituting the side chain of said graft copolymer.

In each case, however, the amount of the polymer having Tg of 10° C. or below should be in the range from 50 to 99% by weight, preferably from 65 to 97% by weight of the whole polymer. If the amount of the polymer having Tg of 10° C. or below is less than 50% by weight of the whole polymer, the produced thermoplastic elastomer may fail to show rubber elasticity in the temperature range above room temperature. If the amount of said polymer exceeds 99% by weight of the whole polymer, the number of physical crosslinking points formed by the side chain is lessened, making the obtained polymer liable to excessive plastic deformation even at room temperature.

Further, said graft copolymer constituting a thermoplastic elastomer of this invention may be optionally blended with a filler such as, for example, carbon black, silica, calcium carbonate, mica, diatom earth, zinc white, basic magnesium carbonate, aluminum silicate, titanium dioxide, talc, glass fiber and the like, plasticizer, anti-aging agent, colorant, ultraviolet absorber, flame retardant, oil resistance improver, anti-scorching agent, tackifier and other appropriate additives.

As for the method for preparing a thermoplastic graft copolymer of this invention, there can be mentioned a process according to which a polymer having Tg of 10° C. or below and having a reactive functional group and/or modified with a reactive functional group is reacted with an aromatic oligomer having at one terminal of its molecule a functional group reactable with the functional group of said polymer.

Thus, the present invention pertains to a process for preparing a thermoplastic graft copolymer which comprises grafting an aromatic oligomer containing 50% by weight or more of the structural units represented by the following formula (I):

(I)

wherein X is selected from O and S, but the structural units containing O and the structural units containing S may both be contained in one oligomer; Ar is selected from

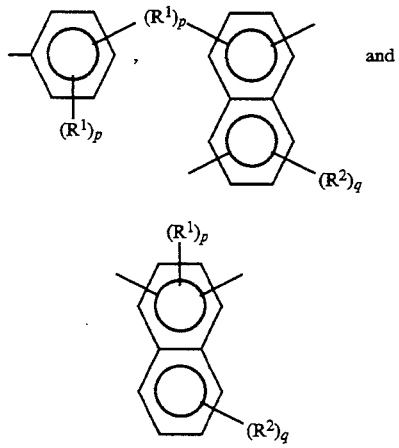

wherein $R^1$ and $R^2$ are each selected from $C_{1-3}$ alkyl group or phenyl group, but $R^1$ and $R^2$ may be a same group or different groups, and the different groups may be attached to one benzene ring; p and q are each an integer of 0–2.

As examples of the reactive functional group in the polymer having Tg of 10° C. or below used in the present invention, the following can be mentioned: epoxy group, amino group, hydroxyl group, carboxyl group, thiol group, isocyanate group, halogen, alkylsilyl ether group, silyl halide group, acid anhydride group, and groups having unsaturated double bonds.

As examples of the functional group in the aromatic oligomer reacted with said polymer in the present invention, there can be mentioned epoxy group, hydroxyl group, carboxyl group, thiol group, halogen, alkylsilyl ether group, silyl halide group, acid anhydride group, and groups having unsaturated double bonds.

The combination of the reactive functional group in the main chain and the functional group in the side chain reactable with said reactive functional group in the main chain can be properly selected within limits not prejudicial to the object of the present invention.

For example, as a method for preparing a thermoplastic graft copolymer of this invention, a process can be cited in which a polymer having Tg of 10° C. or below and having a functional group reactable with carboxyl group is reacted with an aromatic oligomer having flow temperature of 100° C. or above and having a carboxyl group at one terminal of the molecule.

There can be also mentioned a method in which a polymer having Tg of 10° C. or below and having a functional group reactable with acid anhydride group is reacted with an aromatic oligomer having flow temperature of 100° C. or above and having an acid anhydride group at one terminal of the molecule.

There can be further mentioned a method in which a polymer having Tg of 10° C. or below and having radical reactivity is reacted with an aromatic oligomer having flow temperature of 100° C. or above and having radical reactivity at one terminal of the molecule.

A method can be also cited in which a polymer having Tg of 10° C. or below and having unsaturated double bonds in its structure is reacted with an aromatic oligomer having flow temperature of 100° C. or above and having a functional group reactable with said unsaturated double bonds at terminal end of the molecule.

There can be further cited a method in which an organopolysiloxane having Tg of 10° C. or below partially modified with a reactive functional group is reacted with an aromatic oligomer having flow temperature of 100° C. or above and having at one terminal of the molecule a functional group reactable with the functional group of said polysiloxane.

A more detailed description will be given below on the process for preparing a thermoplastic graft copolymer according to the present invention.

A method for preparing a thermoplastic graft copolymer according to the present invention is to react a polymer, which has a glass transition temperature of 10° C. or below and has a functional group reactable with carboxyl group, with an aromatic oligomer which has a flow temperature of 100° C. or above and has a carboxyl group at terminal of the molecule. Preferred examples of said functional group reactable with carboxyl group are glycidyl group, epoxy group, isocyanate group, hydroxyl group and acetoxyl group. Glycidyl group and epoxy group are especially preferred.

As examples of said polymer containing glycidyl group and/or epoxy group, the following copolymers can be cited: methyl acrylate-glycidyl methacrylate copolymer, ethyl acrylate-glycidyl methacrylate copolymer, propyl acrylate-glycidyl methacrylate copolymer, butyl acrylate-glycidyl methacrylate copolymer, hexyl acrylate-glycidyl methacrylate copolymer, dodecyl acrylate-glycidyl methacrylate copolymer, methyl acrylate-glycidylstyrene copolymer, ethyl acrylate-glycidylstyrene copolymer, propyl acrylate-glycidylstyrene copolymer, butyl acrylate-glycidylstyrene copolymer, hexyl acrylate-glycidylstyrene copolymer, dodecyl acrylate-glycidyl styrene copolymer, methyl acrylate-N-[4-(2,3-epoxypropoxy)-3,5-dimethylbenzyl]acrylamide copolymer, ethyl acrylate-N-[4-(2,3-epoxypropoxy)-3,5-dimethylbenzyl]acrylamide copolymer, propyl acrylate-N-[4-(2,3-epoxypropoxy)-3,5-dimethylbenzyl]acrylamide copolymer, butyl acrylate-N-[4-(2,3-epoxypropoxy)-3,5-dimethylbenzyl]acrylamide copolymer, hexyl acrylate-N-[4-(2,3-epoxypropoxy)-3,5-dimethylbenzyl]acrylamide copolymer, dodecyl acrylate-N-[4-(2,3-epoxypropoxy)-3,5-dimethylbenzyl]acrylamide copolymer, acrylonitrile-butadiene-glycidyl methacrylate copolymer, acrylonitrile-butadiene-glycidylstyrene copolymer, acrylonitrile-butadiene-N-[4-(2,3-epoxypropoxy)-3,5-dimethylbenzyl]acrylamide copolymer, ethylene-vinyl acetate-glycidyl methacrylate copolymer, ethylene-vinyl acetate-glycidylstyrene copolymer, ethylene-vinyl acetate-N-[4-(2,3-epoxypropoxy)-3,5-dimethylbenzyl]acrylamide copolymer, ethylene-methyl acrylate-glycidyl methacrylate copolymer, ethylene-ethyl acrylate-glycidyl methacrylate copolymer, ethylene-propyl acrylate-glycidyl methacrylate copolymer, ethylene-butyl acrylate-glycidyl methacrylate copolymer, ethylene-hexyl acrylate-glycidyl methacrylate copolymer, ethylene-dodecyl acrylate-glycidyl methacrylate copolymer, ethylene-methyl acrylate-glycidylstyrene copolymer, ethylene-ethyl acrylate-glycidylstyrene copolymer, ethylene-propyl acrylate-glycidylstyrene copolymer, ethylene-butyl acrylate-glycidylstyrene copolymer, ethylene-hexyl acrylate-glycidylstyrene copolymer, ethylene-dodecyl acrylate-glycidyl-styrene copolymer, ethylene-methyl acrylate-N-[4-(2,3-epxoypropoxy)-3,5-dimethylbenzyl]acrylamide copolymer, ethylene-ethyl acrylate-[4-(2,3-epoxypropoxy)-3,5-dimethylbenzyl]acrylamide copolymer, ethylene-propyl acrylate-N-[4-(2,3-epoxypropoxy)-3,5-dimethylbenzyl]acrylamide copolymer, ethylene-butyl acrylate-N-[4-(2,3-epoxypropoxy)-3,5-dimethylbenzyl]acrylamide copolymer, ethylenehexyl acrylate-N-[4-(2,3-epoxypropoxy)-3,5-dimethylbenzyl]acrylamide copolymer, ethylene-dodecyl acrylate-N-[4-(2,3-epoxypropoxy)-3,5-dimethylbenzyl]acrylamide copolymer, styrene-butadiene-glycidyl methacrylate copolymer, styrene-butadiene-glycidylstyrene copolymer, and styrene-butadiene-N-[4-(2,3-epoxypropoxy)- 3,5-dimethylbenzyl]acrylamide copolymer. These copolymers can be obtained through generally known radical polymerization. Organopolysiloxanes having epoxy group and/or glycidyl group in the side chain can be also mentioned as examples of said polymer.

Also, a polymer having double bonds can be used as main chain of the copolymer of this invention by epoxidation the double bonds of said polymer by a known method, for example, the method described in U.S. Pat. No. 3,155,638.

It is also a recommendable method to act a peracid such as methachloroperbenzoic acid to a toluene solution of ethylene-propylene-diene monomer terpolymer (hereinafter abbreviated as EPDM).

Various methods are available for effecting introduction of glycidyl group into a polymer having double bonds. For instance, grafting can be accomplished by polymerization of a monomer having polymerizable double bond and glycidyl group, such as glycidyl methacrylate, allylglycidyl ether, glycidyl acrylate and the like, in an appropriate organic solvent in the presence of EPDM, or by copolymerization of said monomer and a monomer copolymerizable therewith, such as butyl acrylate.

The aromatic oligomer used in the present invention, which has a flow temperature of 100° C. or above, preferably 150° C. or above, and possessing a carboxyl group at one terminal of the molecule, is preferably selected from those represented by the following formula (II):

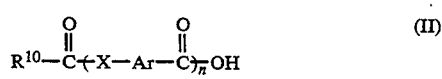

wherein X is selected from O and S, and the structural units containing O and the structural units containing S may be both contained in one oligomer; $R^{10}$ is an alkyl group having 5 or more carbon atoms or an aryl or aralkyl group having 6 or more carbon atoms; Ar is selected from

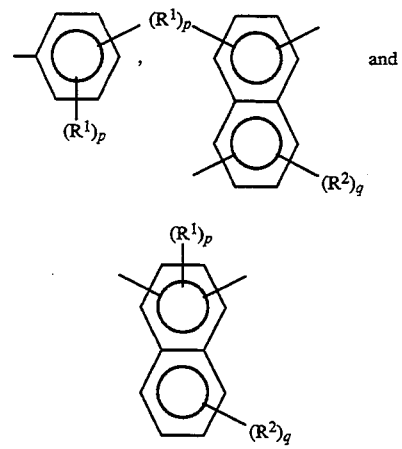

wherein $R^1$ and $R^2$ are each selected from an alkyl group having 1–3 carbon atoms or a phenyl group, but $R^1$ and $R^2$ may a same group or different groups, and the different substituents may be attached to a same benzene ring; p and q are each an integer of 0–2; and n is a number average, which is 2–10.

Said oligomers may be further copolymerized with a hydroxycarboxylic acid having 2–6 carbon atoms. The number-average molecular weight of said aromatic oligomer having a carboxyl group at one terminal of the molecule is preferably in the range of 300 to 1,500, and the number-average degree of polymerization, which depends on the kind of $R^0$, $R^1$, $R^2$ and Ar selected is 2 to 10, preferably 3 to 8, more preferably 4 to 7.

A hydroxyarylcarboxylic acid polymer can be prepared by any method provided that in the process a condensation polymer is produced by using hydroxyarylcarboxylic acid and in certain cases a small amount of a monomer copolymerizable therewith, such as $C_{2-6}$ hydroxyalkylcarboxylic acid, aminoalkylcarboxylic acid, aminoarylcarboxylic acid, monofunctional phenol compounds, carboxylic acid compounds, amino compounds and the like. It is, however, preferred to use the following method.

That is, hydroxyarylcarboxylic acid is added with an acetylating agent such as acetic anhydride, acetyl chloride or the like and the mixture is heated and stirred to obtain acetoxyarylcarboxylic acid. In the above reaction, in case hyroxyarylcarboxylic acid is acetylated with acetic anhydride, the reaction is conducted at a temperature of higher than 100° C. for a period of longer than 15 minutes. In case of using acetyl chloride, acetylation can be accomplished by performing the reaction at a temperature not lower than room temperature for a period of or over 30 minutes. In these reactions, acetic anhydride or acetyl chloride is preferably added in an excess amount, preferably in an amount of about 1.1 mole to 1 mole of the hydroxyl group to be reacted. After acetylation has been completed, acetic acid is distilled away while heating and stirring the reaction system to let the polycondensation reaction proceed on. Temperature in the system needs to be kept preferably above 200° C. The number-average molecular weight can be controlled by adjusting the amount of acetic acid distilled away. For controlling the degree of polymerization at the desired level, it is necessary to calculate the amount of the monomer supplied, such as hydroxyarylcarboxylic acid, and the amount of acetic acid distilled away. The above-described process can be applied for preparing mercaptoarylcarboxylic acid.

The obtained aromatic oligomer is preferably washed with a solvent such as methanol, ethanol, acetone, tetrahydrofuran, N-methylpyrrolidone, chloroform, pyridine or the like to remove the remaining monomers and/or dimers for improving thermal stability of said oligomer.

An aromatic oligomer having a carboxylic acid at one terminal of the molecule can be prepared in the same way as above-described preparation of hydroxyarylcarboxylic acid polymer by acetylating a mixture of a monocarboxylic acid and a hydroxyarylcarboxylic acid having an alkyl group of 5 or more, preferably 5 to 20 carbon atoms and an aryl group of 6 or more, preferably 6 to 15 carbon atoms and if necessary a hydroxycarboxylic acid of 2 to 6 carbon atoms with acetic anhydride or acetyl chloride, and thereafter distilling away acetic acid to obtain a condensation polymer. In this reaction, the number-average molecular weight of the produced aromatic oligomer is decided by the molar ratio of monocarboxylic acid to hydroxycarboyxlic acid.

The obtained oligomer having a carboxylic group at one terminal of the molecule is preferably washed with a solvent such as methanol, ethanol, acetone, tetrahydrofuran, N-methylpyrrolidone, chloroform, pyridine or the like for the same reason as stated above.

A graft copolymer according to the present invention can be obtained by reacting a polymer having Tg of 10° C. or below and having a functional group reactable with carboxylic acid group and an aromatic oligomer whose flow temperature is 100° C. or above and which has a carboxylic acid group at one terminal of the molecule. Reaction method is not subject to any specific restrictions, but a method is preferred in which the reaction is effectuated by melt mixing.

This melt mixing can be accomplished by mixing said polymer having Tg of 10° C. or below and said aromatic oligomer at a temperature higher than flow temperature of said aromatic oligomer by using a well-known mixing machine such as Banbury mixer, single-screw extruder, twin-screw extruder, roll, kneader or any other apparatus which is capable of exerting high shearing force at high temperature.

Reaction temperature is preferably the one which is at least higher than flow temperature of the aromatic oligomer used and lower than thermal decomposition temperature of said polymer having Tg of 10° C. or below. If reaction temperature is lower than flow temperature of the aromatic oligomer used, the reaction between the carboxylic acid of said aromatic oligomer and the polymer having Tg of 10° C. or below is sluggish, making it hard to obtain a desired graft copolymer. If reaction temperature is higher than thermal decomposition temperature of the polymer having Tg of 10° C. or below, there takes place excessive decomposition of said polymer in the course of mixing, producing adverse effects such as decrease of molecular weight.

For promoting grafting, it is desirable that temperature is as high as possible within said range, reaction time is as long as possible and shearing force is as great as possible. For further promoting grafting, it is desirable to add a phosphine type catalyst, tertiary amine or the like.

Next, as a method for preparing a thermoplastic graft copolymer of this invention, there can be mentioned a method in which a polymer whose glass transition temperature is 10° C. or below and which has a functional group reactable with acid anhydride group is reacted with an aromatic oligomer whose flow temperature is 100° C. or above and which has an acid anhydride group at one terminal of the molecule.

As the functional group reactable with acid anhydride group, there can be cited glycidyl group, epoxy group and amino group.

As the polymer containing glycidyl group and/or epoxy group, there can here again be cited the aforementioned polymers containing epoxy group and/or glycidyl group which are reactable with aromatic oligomers having carboxyl group at one end of the molecule. That is, there can be cited previously mentioned various copolymers prepared from copolymerization using such as glycidyl methacrylate, glycidylstyrene or allylglycidyl ether. There can be further cited the polymers having their double bonds epoxidated and the organopolysiloxanes having glycidyl group and/or epoxy group in the side chain. Further, as the polymers having amino group, there can be cited various copolymers prepared by copolymerizing the monomers having unsaturated double bond and amino group in the same molecule, such as aminostyrene, allylamine, etc., and various polymers modified by grafting said monomers to the side chain.

The aromatic oligomers having a flow temperature of 100° C. or above, preferably 150° C. or above, and possessing an acid anhydride at one terminal of the molecule, which are usable in the present invention, are preferably those represented by the following formula (III).

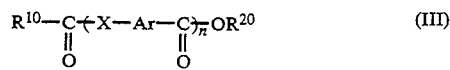

wherein X is selected from O and S, but the structural units containing O and the structural units containing S may both be contained in one oligomer; when $R^{10}$ is

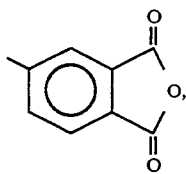

$R^{20}$ is selected from hydrogen, alkyl group having 1–10 carbon atoms and aryl group having 6–20 carbon atoms, and when $R^{20}$ is

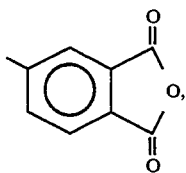

$R^{10}$ is selected from alkyl group having 1–10 carbon atoms and aryl group having 6–20 carbon atoms; Ar is selected from

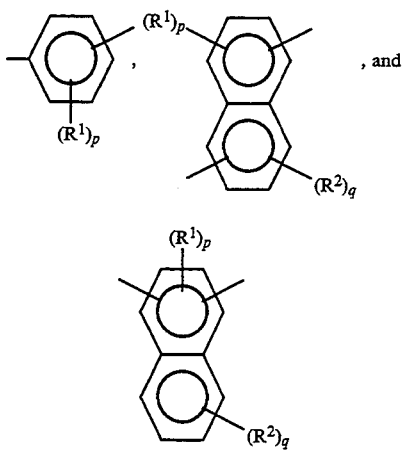

wherein
$R^1$ and $R^2$ are each selected from alkyl group having 1–3 carbon atoms or phenyl group, but $R^1$ and $R^2$ may be a same group or different groups, and the different substituents may be attached to a same benzene ring; p and q are each an integer of 0–2; and n is a number average, which is 2–10.

Said aromatic oligomers can be obtained by mixing and condensing trimellitic acid anhydride or 4-acetoxyphthalic anhydride and acetoxyarylcarboxylic acid in a molar ratio of 1:1 to 1:10. Those of the formula (III) wherein X is S can be prepared in the same way as described above.

The acetoxyarylcarboxylic acids usable in this invention are, for instance, those obtained by acetylating hydroxyarylcarboxylic acids having 7 or greater, preferably 7 to 20 carbon atoms. More specifically, they include those represented by the following formulae:

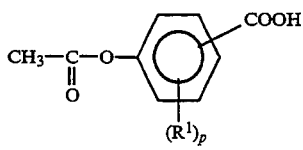

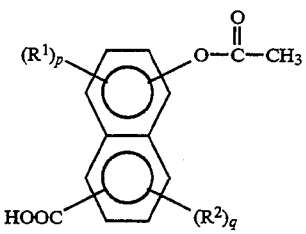

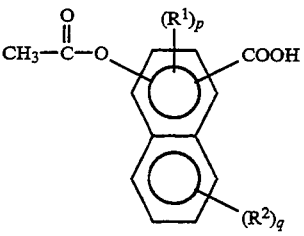

wherein $R^1$ and $R^2$ are each selected from alkyl group having 1 to 3 carbon atoms and phenyl group, but $R^1$ and $R^2$ may be the same or different, and the different substituents may be attached to a same benzene ring; p and q are each an integer of 0 to 2.

Among these acetoxyarylcarboxylic acids, paraacetoxybenzoic acid is preferably used.

The aromatic oligomers having acid anhydride at one terminal of the molecule, which are usable in this invention, can be obtained by distilling away acetic acid from a mixture of trimellitic acid anhydride or 4-acetoxyphthalic anhydride and acetoxyarylcarboxylic acid.

In the above reaction, acetoxyarylcarboxylic acid can be obtained by acetylating hydroxyarylcarboxylic acid with acetic anhydride or acetyl chloride. In case of acetylating hydroxyarylcarboxylic acid with acetic anhydride, the reaction is carried out at a temperature of or above 100° C. for a period of or longer than 15 minutes. In the case of the reaction using acetyl chloride, acetylation is accomplished by conducting the reaction at a temperature not lower than room temperature for a period not less than 30 minutes.

In either reaction, acetic anhydride or acetyl chloride is added in excess, preferably in an amount of about 1.1 mole to 1 mole of the hydroxyl group to be reacted.

After acetylation has been completed, trimellitic acid anhydride or 4-acetoxyphthalic acid anhydride is mixed in the system, and while heating and stirring the mixed system, acetic acid is distilled away to let the polycondensation reaction proceed.

Temperature in the system needs to be kept preferably above 200° C.

The number-average degree of polymerization degree of the aromatic oligomer obtained from this reaction is decided by the molar ratio of hydroxyarylcarboxylic acid to trimellitic acid anhydride or 4-acetoxyphthalic anhydride, which were supplied in the system.

In order to obtain a graft copolymer and TPE by reacting an aromatic oligomer specified in this invention with a thermoplastic polymer having Tg of 10° C. or below, it is desirable that flow temperature of said aromatic oligomer is between 100° and 400° C., more preferably between 150° and 350° C. Also, trimellitic acid anhydride or acetoxyphthalic anhydride and acetoxyarylcarboxylic acid are mixed preferably in a molar ratio of 1:1 to 1:10, more preferably 1:1.5 to 1:8, for effectuating polycondensation.

If the number of moles of acetoxyarylcarboxylic acid is less than that of trimellitic acid anhydride or acetoxyphthalic anhydride, the obtained aromatic oligomer proves to be low in molecular weight and susceptible to thermal decomposition. Also, flow temperature of said oligomer lowers excessively, so that when such oligomer is used as hard segment of TPE, the obtained TPE is found poor in thermal resistance.

Also, if said acids are mixed and polycondensed with the number of moles of acetoxyarylcarboxylic acid exceeding 10 times that of trimellitic acid anhydride or acetoxyphthalic anhydride, flow temperature of the obtained aromatic oligomer becomes higher than 400° C. and approximates thermal decomposition temperature of said aromatic oligomer, so that when such oligomer is used as hard segment of TPE, the obtained TPE is deteriorated in moldability.

Further, it is desirable that the obtained aromatic oligomer be pulverized, then washed with stirring with a solvent selected from acetone, tetrahydrofuran, N-methylpyrrolidone, chloroform and pyridine, and then filtered, whereby the monomer and dimer contained in the aromatic oligomer after polycondensation are substantially washed away to improve thermal stability of said aromatic oligomer.

The aromatic oligomer used in the present invention, namely the aromatic oligomer having an acid anhydride at one terminal of its molecule, can be applied as a grafting agent in reaction with various types of polymers having a functional group reactable with the acid anhydride to realize enhancement of performance and function of said polymers.

Especially, by synthesizing a graft copolymer by reacting said aromatic oligomer with a thermoplastic polymer having a functional group reactable with acid anhydride and a glass transition temperature of 10° C. or below, in a weight ratio of 1:99 to 50:50, it is possible to produce a thermoplastic elastomer having high heat resistance.

Method for the above reaction is not specifically defined, but a method is preferred in which the reaction is performed by melt mixing.

Next, as a method for preparing a thermoplastic graft copolymer of this invention, there can be cited a method in which a polymer whose glass transition temperature is 10° C. or below and which has radical reactivity is reacted with an aromatic oligomer whose flow temperature is 100° C. or above and which has, at one terminal of the molecule, a functional group having radical reactivity.

As the polymers containing the structural units having radical reactivity, which are usable in this invention, there can be cited ethylene-propylene copolymer, ethylene-propylene-butadiene copolymer, ethylene-propylene-isoprene copolymer, ethylene-propylene-1,4-hexadiene copolymer, ethylene-propylene-dicyclopentadiene copolymer, ethylene-propylene-methylene norbornene copolymer, and ethylene-propylene-ethylidene norbornene copolymer and the like.

The aromatic oligomers having a flow temperature of 100° C. or above, preferably 150° C. or above, and possessing a functional group with radical reactivity at one terminal of the molecule, which are usable in this invention, are those represented by the following formula:

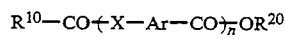

wherein X is selected from O and S; Ar is a divalent arylene group; when $R^{10}$ is a functional group with radical reactivity, $R^{20}$ is selected from hydrogen, alkyl group having 1–10 carbon atoms and aryl group having 6–20 carbon atoms, and when $R^{20}$ is a functional group with radical reactivity, $R^{10}$ is selected from alkyl group having 1–10 carbon atoms and aryl group having 6–20 carbon atoms; and n is a number average, which is 2–10.

As the functional groups having radical reactivity, there can be cited the groups having an arylmaleimide structure, preferably those of the following formula:

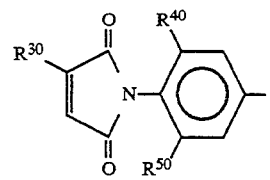

wherein $R^{30}$, $R^{40}$ and $R^{50}$ are each selected from hydrogen and alkyl group having 1–4 carbon atoms.

Said aromatic oligomers can be produced from polycondensation reaction of carboxyarylmaleimide or hydroxyarylmaleimide and hydroxyarylcarboxylic acid. Preferably, the hydroxyl group is first acetylated with an acetylating agent such as acetic anhydride, acetyl chloride or the like and then the reaction system is deacetated to effectuate polycondensation. The desired oligomers can be also produced according to the above process in case X in the above formula is S.

The aromatic oligomer used in the present invention, namely the aromatic oligomer having a functional group with radical reactivity at one terminal of the molecule, can be applied as a grafting agent in reaction with various types of polymers having radical reactivity to realize enhancement of performance and function of said polymers.

Especially, by synthesizing a graft copolymer by reacting said aromatic oligomer with a thermoplastic polymer having radical reactivity and a glass transition temperature of 10° C. or below, it is possible to produce a thermoplastic elastomer having high thermal resistance.

Method for the above reaction is not subject to any specific restrictions, but a method is preferred in which the reaction is performed by melt mixing. For promoting grafting, a radical initiator effective at said reaction temperature is properly selected and used. As such radical initiator, there can be cited, for example, butyl hydroperoxide and cumyl hydroperoxide.

Next, as another method for preparing a thermoplastic graft copolymer of this invention, there can be mentioned a method in which a polymer having a glass transition temperature of 10° C. or below and having unsaturated double bonds in its structure is reacted with an aromatic oligomer having a flow temperature of 100° C. or above and having at one terminal of the molecule a functional group reactable with the unsaturated double bonds.

As the polymers having a glass transition temperature of 10° C. or below and having unsaturated double bonds in its structure, which are usable in the present invention, there can be cited, for example, ethylene-propylene-butadiene copolymer, ethylene-propylene-isoprene copolymer, ethylene-propylene-1,4-hexadiene copolymer, ethylene-propylene-dicyclopentadiene copolymer and ethylene-propylene-ethylidene norbornene copolymer.

The aromatic oligomers having a flow temperature of 100° C. or above, preferably 150° C. or above, and having a functional group reactable with unsaturated double bonds at one terminal of the molecule are those represented by the following formula:

wherein X is selected from O and S; Ar is a divalent arylene group; when $R^{10}$ is a functional group with radical reactivity, $R^{20}$ is selected from hydrogen, alkyl group having 1-10 carbon atoms and aryl group having 6-20 carbon atoms, and when $R^{20}$ is a functional group with radical reactivity, $R^{10}$ is selected from alkyl group having 1-10 carbon atoms and aryl group having 6-20 carbon atoms; and n is a number average, which is 2-10.

Halomethylaryl group and tertiary haloalkyl group can be cited as preferred examples of the functional group reactable with unsaturated double bonds. Halomethylaryl group is especially preferred.

Said aromatic oligomers can be produced from polycondensation reaction using halomethylaryl carboxylic acid and acetoxyarylcarboxylic acid as reactants. Preferably, hydroxyl group is acetylated with an acetylating agent such as acetic anhydride, acetyl chloride or the like and then the reaction system is deacetated to effectuate polycondensation. The desired oligomers can be also produced according to above process in case X in the above formula is S.

The aromatic oligomer used in the present invention, namely the aromatic oligomer having a functional group reactable with unsaturated double bonds at one terminal of the molecule, can be applied as a grafting agent in reaction with various types of polymers having unsaturated double bonds in its structure to realize enhancement of performance and function of said polymers.

Especially, by synthesizing a graft copolymer by reacting said aromatic oligomer with a thermoplastic polymer having unsaturated double bonds in its structure and Tg of 10° C. or below, it is possible to produce a thermoplastic elastomer having high thermal resistance.

Further, the case where the main chain of the graft copolymer according to this invention is a polyorganosiloxane is described in detail.

As combination of reactive functional group of main chain organopolysiloxane and reactable functional group for the side chain, there can be cited the combinations of: amino group-containing organic group bonded to silicon and acid anhydride group; epoxy group-containing organic group bonded to silicon and carboxyl group or acid anhydride group; hydrogen atom bonded to silicon and organic group containing unsaturated double bond.

The modified organopolysiloxanes usable in this invention are those represented by the following formula (IV):

wherein $R^1$, $R^2$ and $R^3$ are each selected from alkyl groups having 1-4 carbon atoms and

wherein R is an alkyl group having 1-3 carbon atoms and l is an integer of 0-2; $R^4$ is hydrogen or a group selected from $-X_1-R'$, $-X_2-NH-X_3-R'$ and $-X_2-O-X_3-R'$ wherein $R'$ is selected from amino group and epoxy group, $X_1$ is a hydrocarbon having 1-20 carbon atoms, and $X_2$ and $X_3$ are each a hydrocarbon having 1-10 carbon atoms; and m and n are each a number so selected that the equivalent of said functional group will become about 500-10,000, preferably about 2,000-4,000.

Preferred among these organopolysiloxanes are those of the formula (IV) wherein $R^1$, $R^2$ and $R^3$ are selected from $-CH_3$, $-C_2H_5$ and

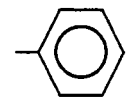

and $R^4$ is selected from $-X_2$, $-NH-X_3-NH_2$,

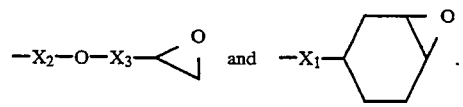

Next, the aromatic oligomers usable for forming the side chain, when the main chain is an organopolysiloxane, are represented by the following formula (V):

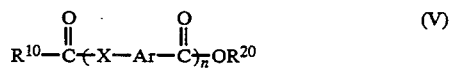

wherein X is selected from O and S, and the structural units containing O and the structural units containing S may be both contained in one oligomer; Ar is a divalent arylene group; and n is a number average, which is 2-10.

Here, in case the main chain organopolysiloxane has an epoxy group as reactive functional group, the aromatic oligomer for the side chain is preferably the one having a carboxyl group at one terminal of the molecule.

That is, in the formula (V), $R^{20}$ is hydrogen, and this formula (V) coincides with the previously shown formula (II). Also, regarding representations by $R^{10}$, Ar and n, those mentioned in relation to the formula (II) are preferred.

In case the main chain organopolysiloxane has an amino group as reactive functional group, the aromatic oligomer for the side chain is preferably the one having an acid anhydride group.

That is, in this case, the formula (V) is preferably the one which coincides with the previously shown formula (III). Also, regarding representations by $R^{10}$, $R^{20}$, Ar and n those mentioned in relation to the formula (III) are preferred.

Further, in case the main chain organopolysiloxane has hydrogen atom bonded to silicon as reactive functional group, the aromatic oligomer for the side chain should be the one having unsaturated double bond at one terminal of the molecule.

That is, in this case, the formula (V) may be either the one which coincides with the formula (III) or the one in which $R^{10}$ or $R^{20}$ is an organic group which has unsaturated double bond, has 3-20 carbon atoms and may contain a hetero-atom. When $R^{10}$ is a functional group containing unsaturated double bond, $R^{20}$ is a group inert to the reaction, and when $R^{20}$ is a functional group containing unsaturated double bond, $R^{10}$ is a group inert to the reaction.

For promoting grafting, it is desirable to add platinum or a platinum compound in case the functional group of said polysiloxane is hydrogen atom bonded to silicon and the functional group of the selected aromatic polymer is unsaturated double bond, and to add a phosphine type catalyst, tertiary amine or the like in the case of combination of epoxy group and carboxyl group. An ordinary organic solvent such as 1-methyl-2-pyrrolidone may be used as required.

Now, the case where the polymer having Tg of 10° C. or below has been partially crosslinked is described in detail.

Here, the main chain with Tg of 10° C. or below and the aromatic oligomer having flow temperature of 100° C. or above are the same as described above.

The method for preparing a thermoplastic graft copolymer according to this invention is characterized in that a polymer which has a Tg of 10° C. or below and has a functional group reactable with aromatic oligomer is partially crosslinked with an organic peroxide and/or a compound having two or more functional groups reactable with above-said functional group in one molecule, and that said polymer is reacted with an aromatic oligomer which has a flow temperature of 100° C. or above and has a functional group reactable with said polymer.

As the especially preferred preparation method, there can be cited a method in which a polymer having Tg of 10° C. or below and having a functional group reactable with carboxyl group is first partially crosslinked with an organic peroxide and/or a compound having two or more functional groups reactable with above-said functional group in one molecule, and then is reacted with an aromatic oligomer having a flow temperature of 100° C. or above and having a carboxylic group at one terminal of the molecule, or a method in which when a polymer having Tg of 10° C. or below and having a functional group reactable with carboxyl group is reacted with an aromatic oligomer having a carboxyl group at one terminal of the molecule, an organic peroxide and/or a compound having two or more functional groups reactable with above-said functional group in one molecule are added to let the polymer having Tg of 10° C. or below be partially crosslinked, consequently obtaining a graft copolymer. As this functional group reactable with carboxyl group, there are recommended the previously mentioned glycidyl group, epoxy group, isocyanate group, hydroxyl group and acetoxy group. Glycidyl group is especially preferred.

The organic peroxides usable in this invention are those whose decomposition temperature is 100°-220° C., when its half-life period is 10 minutes. Examples of such organic peroxides are succinic acid peroxide, benzoyl peroxide, t-butyl peroxy-2-ethylhexanoate, p-chlorobenzoyl peroxide, t-butyl peroxyisobutyrate, t-butyl peroxyisopropylcarbonate, t-butyl peroxylaurate, 2,5-dimethyl-2,5-di(benzoylperoxy)hexane, t-butyl peroxyacetate, di-t-butyl diperoxyphthalate, t-buyl-peroxymaleic acid, cyclohexanone peroxide, t-butyl peroxybenzoate, dicumyl peroxide, 2,5-dimethyl-2,5-di(t-butylperoxy)hexane, t-butyl cumylperoxide, t-butyl hydroperoxide, di-t-butyl peroxide, 2,5-dimethyl-2,5-di-(t-butylperoxy)hexyne-3, di-isopropylbenzene hydroperoxide, p-menthane hydroperoxide, and 2,5-dimethyl-hexane-2,5-dihydroxyperoxide.

The amount of the organic peroxide used in this invention is generally 0.1 to 5 parts by weight to 100 parts by weight of said polymer. When said amount is less than 0.1 part by weight, partial crosslinking proves insufficient, and when said amount exceeds 5 parts by weight, partial crosslinking is made to an excessive degree and the obtained graft copolymer is incapable of melt flow even at a temperature above the flow temperature of the aromatic polymer used, making it unable to perform melt molding.

In case partial crosslinking is effected by using, along with an organic peroxide, a compound containing two or more functional groups reactable with carboxyl group in one molecule, it is necessary to reduce the amount of the organic peroxide to such an extent that the obtained graft copolymer will be capable of melt flow at a temperature above the flow temperature of the aromatic oligomer used.

As for the compound having two or more functional groups reactable with carboxyl group in one molecule, which can be used for partially crosslinking a polymer having Tg of 10° C. or below in the present invention, there are selected one or more compounds according to the type of said functional groups from the compounds having, in one molecule, two or more of at least one type of the functional group selected from carboxyl group, hydroxyl group and amino group, for example, the low-molecular weight compounds of phthalic acid, isophthalic acid, terephthalic acid, trimellitic acid, trimesic acid, hydroquinone, p-phenylenediamine, p-aminophenol, m-aminophenol, p-aminobenzoic acid, m-aminobenzoic acid and the like, and the aromatic polyester oligomers represented by the following formula:

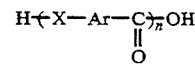

wherein Ar is selected from

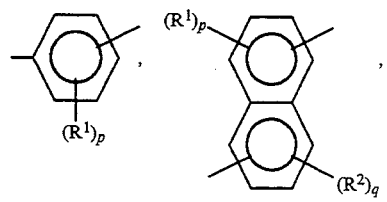

and

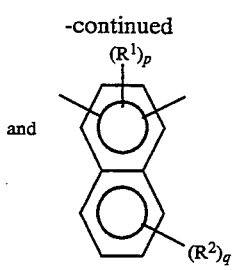

and wherein $R^1$ and $R^2$ are each selected from alkyl group of 1–3 carbon atoms and phenyl group and may be the same or different, and the different substituents may be attached to one benzene ring, and p and q are each an integer of 0–2; X is selected from O and S; and n is a number average, which is 2–10.

These aromatic polyester oligomers can be synthesized by polycondensing n moles of hydroxyarylcarboxylic acid and (n−1) moles of acetic anhydride by first acetylating said hydroxyarylcarboxylic acid with acetic anhydride and then deacetating the reaction system, in the same way as preparation of the aromatic oligomers having carboxyl group at one terminal of the molecule.

These aromatic polyesteroligomers are also preferably washed with a solvent such as methanol, ethanol, acetone, tetrahydrofuran, N-methylpyrrolidone, chloroform, pyridine or the like to remove the monomer and dimer for improving thermal stability of the obtained polymer.

It is also desirable that these compounds be used in an amount that will provide a degree of crosslinking sufficient to make the obtained graft copolymer capable of melt flow at a temperature above the flow temperature of the aromatic oligomer used.

Reaction method is not specifically defined, but a method in preferred in which the reaction is performed by melt mixing.

In any case, mixing can be accomplished by using a well-known mixing machine such as Banbury mixer, single-screw extruder, twin-screw extruder, roll, kneader, or any other apparatus capable of exerting high shearing force at high temperature.

Reaction temperature is preferably above the temperature at which the reaction system is perfectly melted, that is, in case a polymer having Tg of 10° C. or below is first partially crosslinked with an organic peroxide and/or a compound having in one molecule thereof two or more functional groups reacting with the functional group reactable with carboxyl group, it is desirable that the reaction temperature is above the melting temperature of the compound having the highest melting point in the organic peroxide and/or said type of compound used and below the thermal decomposition temperature of the polymer having Tg of 10° C. or below used. If reaction temperature is below the melting point or flow temperature of the compound used, desired partial crosslinking hardly progresses. If reaction temperature exceeds the thermal decomposition temperature of the polymer having Tg of 10° C. or below, there takes place excessive decomposition of said polymer, causing adverse effects such as decrease of molecular weight.

In case a polymer having Tg of 10° C. or below is reacted with an organic peroxide and/or a compound having in one molecule thereof two or more functional groups reacting with the functional group reactable with carboxyl group and an aromatic oligomer having carboxyl group at one terminal of the molecule for letting both partial crosslinking and grafting proceed simultaneously, it is desirable that the reaction temperature is above the flow temperature of the aromatic oligomer used and below the thermal decomposition temperature of the polymer having Tg of 10° C. or below used.

If reaction temperature is below the flow temperature of said aromatic oligomer, the reaction between the carboxylic acid of said aromatic oligomer and the polymer having Tg of 10° C. or below is sluggish, making it hard to obtain a graft copolymer. If reaction temperature exceeds the thermal decomposition temperature of said polymer having Tg of 10° C. or below, there takes place excessive decomposition of said polymer in the course of mixing, causing adverse effects such as decrease of molecular weight.

A higher temperature within the above-defined temperature range, a longer reaction time and a greater shearing force are preferred for promoting grafting. It is also desirable to add a phosphine type catalyst, tertiary amine or the like for further promoting grafting.

The graft copolymers of this invention are capable of melt molding at high temperature. They also show the behavior of an excellent rubber-like elastomer in the wide temperature range from room temperature to a very high temperature and thus are very useful as a thermoplastic elastomer with excellent thermal resistance.

Therefore, they are useful as material for automobiles, electric and electronic parts, sporting goods, etc. For instance, they can be used as material for various types of hose such as oil cooler hose, air duct hose, power steering hose, control hose, oil return hose, heat-resisting hose, etc., material for various types of seal such as oil seal, O-ring, packing, gasket, etc., and material for various types of diaphragm, rubber plate, belt, oil level gage, hose masking, sound insulator, wire coating, sports shoes, etc. Thus, they find a very wide scope of application and are of great utility.

BEST MODE FOR CARRYING OUT THE INVENTION

Hereinafter, the present invention is described in further detail with reference to the examples thereof. It is to be understood, however, and these examples are in no way restrictive to the scope of the invention.

The conditions for determination of various properties are as described below.

Tensile test

Measurements were made according to ASTM D-638 by using a tensile tester Tensilon EM-500 mfd. by Toyo Baldwin Co., Ltd. As regards permanent set, in case elongation at break exceeded 600%, the test piece was kept as it was for 10 minutes after 300% elongation and then contracted, and elongation 10 minutes thereafter was measured.

Compression set test

Compression set was determined according to JIS K-6301 by using a constant strain compression tester mfd. by Toyo Seiki Seisaku-sho, Ltd.

Shore hardness

Measured according to ASTM D-2240 by using a Shore hardness tester mfd. by Toyo Seiki Seisaku-sho, Ltd. Sample thickness was 4.2 mm. Measurement was made at intervals of 15 seconds.

Flow temperature

By using a Koka-type flow tester CFT-500 mfd. by Shimadzu Corporation, the sample was melted by heating at a rate of 4° C./min and extruded from a nozzle of 1 mm in inner diameter and 10 mm long under a load of 100 kg/cm$^2$, and the temperature at which the melt viscosity of the sample became 48,000 poises in the above operation was designated flow temperature.

Melt index

Determined by a melt indexer mfd. by Toyo Seiki Seisaku-sho, Ltd. (The conditions are shown in the tables.)

EXAMPLE 1

An ethylene-methyl acrylate-glycidyl methacrylate terpolymer (ethylene:methyl acrylate: glycidyl methacrylate=35:63:2 (by weight); MI=8.7 g/10 min as measured at 190° C. under a load of 2.16 kg) was obtained by following the process described in Example 5 of Japanese Patent Application Kokai (Laid-Open) No. 61-127709.

The glass transition temperature of this polymer was measured by a stand-alone differential scanning calorimeter DSC-50 mfd. by Shimadzu Corporation in a nitrogen atmosphere at a heating rate of 10° C./min. From the obtained chart, the endotherm starting temperature was determined according to the tangential method in the usual way and this temperature was designated glass transition temperature. The glass transition temperature of said polymer was −33.7° C. Also, the thermogram of this polymer was determined by using a stand-alone thermogravimeter TGA-50 mfd. by Shimadzu Corporation in a nitrogen atmosphere at a heating rate of 10° C./min. From this determination, it was found that the present polymer was thermally stable up to a temperature close to 350° C.

Then, an aromatic oligomer having carboxyl group at one terminal of the molecule was synthesized in the following way. 0.4 mol (48.8 g) of benzoic acid, 0.8 mol (110.4 g) of p-hydroxybenzoic acid and 0.88 mol (90 g) of acetic anhydride were supplied into a 500 ml separable flask provided with an anchor shaped agitator, a three-way stop-cock and a Dimroth condenser. A Teflon sheet cut into a proper size was used as packing disposed between the upper and lower portions of the flask. The anchor shaped agitator was turned at a speed of 120 r.p.m., nitrogen was introduced through three-way way cock to place the system under a nitrogen atmosphere, and cooling water was passed into the Dimroth condenser. In this state, the separable flask was placed in an oil bath and the latter was heated to 160° C. With the oil bath maintained at 160° C., the acetylation reaction was performed for two hours while refluxing acetic anhydride. Upon completion of the acetylation reaction, the Dimroth condenser was quickly replaced with a Liebig condenser and the oil bath was heated to 260° C. About 40 minutes were required for raising the oil bath temperature from 160° C. to 260° C. Thereafter, the oil bath temperature was kept at 260° C. and acetic acid and acetic anhydride distilled out from the system were recovered by the Liebig condenser. Recovery of acetic acid, etc. was started after replacement of the Dimroth condenser with the Liebig condenser, and polycondensation was terminated at the point when 104 g of acetic acid, etc. was recovered in about one hour.

After the end of polycondensation, the oligomer was taken out and pulverized by a pulverizer. There was obtained 130 g of powder. This powder was washed with 10 times as much amount (1,300 g) of methanol in the manner described below to remove the low-molecular weight components soluble in methanol. 130 g of said powder and 1,300 g of methanol were supplied into a 2-litre separable flask provided with an anchor shaped agitator and a Dimroth condenser, then the separable flask was placed in an 80° C. oil bath in a manner that methanol may be refluxed in the system, and washing was carried out for one hour under refluxing of methanol. After washing, the solution was immediately filtered to recover the oligomer. The recovered oligomer was dried by a vacuum dryer at 80° C. for 10 hours to obtain an aromatic oligomer having a carboxyl group alone at one terminal of the molecule. There was obtained 85.8 g of oligomer. Yield was 66%.

The flow temperature of this purified oligomer was measured. It was 182° C. Then weight loss on heating of this purified oligomer was measured by using the aforementioned apparatus TGA-50 in a nitrogen atmosphere at a heating rate of 10° C./min. From these measurements, it was found that this purified oligomer was stable up to a temperature close to 300° C. Also, this oligomer showed optical anisotropy in a melting state.

Next, the result of determination of molecular weight distribution of this purified oligomer is shown. Determination was made by using HLC-8020 mfd. by Tosoh Co., Ltd., with column size of 7.8 mm ID×30 cm. A sample was prepared by dissolving 5 mg of said oligomer in 5 ml of tetrafluorophenol, and this sample was diluted with 2 times as much volume of chloroform and then prefiltered with a 0.45 μm mesh filter. A mixed solution of tetralfuorophenol and chloroform (tetrafluorophenol:chloroform=1:2.721 by volume) was used as moving phase. For determining the molecular weight at each peak, fractionation was carried out according to a conventional method, followed by mass spectrometric analysis, which showed that the peak at retention time of 54.48 min corresponds to n=1 in the formula shown below, while the peaks at 52.57 min, 51.35 min, 50.47 min and 49.85 min correspond to n=2, n=3, n=4 and n=5, respectively, in the following formula:

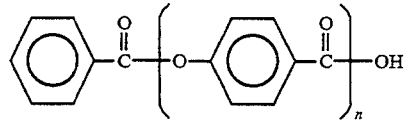

From this determination, it was found that the number-average degree of polymerization of said oligomer was n=3.5 in the above-shown formula, and that the Q value (weight-average molecular weight/number-average molecular weight) of said polymer was about 1.55.

In the above-described determination of molecular weight distribution, however, since the high-molecular weight component of said oligomer is not dissolved in tetrafluorophenol, the molecular weight distribution of only the portion dissolved in tetrafluorophenol after filtration was determined.

For determining the number-average molecular weight of said aromatic oligomer more precisely, the number-average molecular weight was decided by the chemical decomposition method described below. The "chemical decomposition method" is a method in which said aromatic oligomer is decomposed into monomer units by chemically severing the ester linkage of said oligomer in N-methylpyrrolidone solvent by using n-butylamine as decomposing agent, and the decomposed component is identified and quantified by liquid chromatography and the number-average degree of polymerization are determined from the number of the terminal groups.

More specifically, 50 mg of said oligomer was supplied into an egg-plant type flask containing 40 ml of N-methylpyrrolidone and 10 ml of n-butylamine and subjected to 12-hour decomposition under stirring by a magnetic stirrer in an 80° C. oil bath provided with a condenser. By this operation, said oligomer was decomposed into N-n-butyl benzamide, N-n-butyl-p-hydroxy benzamide and p-hydroxybenzoic acid. After removing excess n-butylamine by an evaporator, the residue was filtered by a membrane filter with a pore side of 0.45μ to prepare a test sample.

Measurement was made by using a high-performance liquid chromatography system mfd. by Tosoh Co., Ltd. (pump: TOSOH CCPM, pump controller: TOSOH PX-8010, gradienter: TOSOH GE-8000, dynamic mixer: TOSOH MX-8010, UV detector: TOSOH MX-8010 (used at a detecting wavelength of 254 nm), recorder: Chromatorecorder 12 mfd. by System Instruments Co., Ltd., column: TOSOH TSK-Gel ODS-120T), and each component was eluted and quantified by the water/methanol gradient elution method.

The water used as solvent was a 1000:5 (by volume) mixture of ion exchange water and acetic acid, and the methanol used was a 1000:5 (by volume) mixture of methanol of electronic industrial grade produced by Sumitomo Chemical Industries Co., Ltd. and acetic acid. As for the gradient condition, measurement was conducted at the aqueous system concentrations of 75 vol % for 0 minute, 60 vol % for 30 minutes, 0 vol % for 50 minutes and 75 vol % for 60 minutes (concentration being changed linearly in each case).

Determination of the components of said sample under said measuring conditions showed parahydroxybenzoic acid/N-n-butyl-p-hydroxy benzamide/N-n-butyl benzamide = 1.0/3.2/1.0 (by mole), and the number-average degree of polymerization of said oligomer was n=4.2 in the following formula:

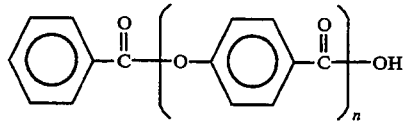

The above-described ethylene-methyl acrylate-glycidyl methacrylate terpolymer and aromatic oligomer having carboxyl group at one terminal of the molecule with the number-average degree of polymerization terminal n=3.5 in the above-shown formula (n=4.2 according to the chemical decomposition method) were reacted along with triphenylphosphine by melt mixing them in a weight ratio of ethylene-methyl acrylate-glycidyl methacrylate terpolymer/aromatic oligomer/triphenylphosphine=90/10/0.1 (=45 g/5 g/50 mg) by Laboplastomill Model ME-15 mfd. by Toyo Seiki Seisaku-sho, Ltd., equipped with a R-60 type mixer and a roller type blade, at a speed of 120 r.p.m. in a nitrogen atmosphere at 280° C. for 15 minutes to obtain a graft copolymer. MI of the thus obtained graft copolymer at 230° C. under a load of 10 kg was 4.5 g/10 min.

The graft efficiency of the obtained graft copolymer was calculated through analysis according to the following techniques. 500 mg of the obtained graft copolymer was put into a mixture of 40 ml of N-methylpyrrolidone and 10 ml of n-butylamine to decompose the aromatic oligomer portion according to the previously described chemical decomposition method. Then, for removing the ethylene-methyl acrylate-glycidyl methacrylate copolymer portion, it was precipitated in 500 ml of methanol and filtered out. The filtrate was concentrated by an evaporator and after removing methanol and excess n-butylamine, the residue was passed through a membrane filter with a pore size of 0.45μ to prepare a test sample.

The sample was subjected to the analysis by high-performance liquid chromatography to quantify the decomposed components in the same way as described above. Calculation can be made from the ratio of N-n-butylbenzamide to p-hydroxybenzoic acid which are decomposed from the aromatic oligomer portion. More specifically, supposing that the ratio of N-n-butylbenzamide/p-hydroxybenzoic acid to be determined as decomposed components is $$X\left( = \frac{\text{p-hydroxybenzoic acid}}{\text{N-n-butyl benzamide}} \right),$$

the number-average degree of polymerization of the aromatic polymer used is n and the amount of the aromatic oligomer reacted is Y (wt %), the graft efficiency is calculated as follows.

When the rate of the aromatic oligomer reacted with the ethylene-methyl acrylate-glycidyl methacrylate copolymer is expressed as $G_1$, it is given as: $G_1 = (1-X) \times 100$ (%). And when the reaction rate of the epoxy group of the ethylene-methyl acrylate-glycidyl methacrylate copolymer is expressed as $G_2$, it is given as:

$$G_2 = \frac{(1-X) \times Y \times 142}{(100-Y) \times 0.02 \times (120n + 122)} \times 100\ (\%)$$

The thus determined a graft efficiency is shown in Table 1.

This graft copolymer was worked into a 2.1 mm thick pressed sheet at 280° C. under a pressure of 50 kg/cm², and the test pieces for determining various properties were cut out from said pressed sheet and subjected to determination of properties. The results are shown in Table 1.

EXAMPLES 2–4 AND COMPARATIVE EXAMPLE 1

The ethylene-methyl acrylate-glycidyl methacrylate terpolymer, the aromatic oligomer having carboxyl group at one terminal of the molecule and triphenylphosphine, which were used in Example 1, were subjected to the same process as Example 1, with their ratios by weight being changed as shown in Table 1, to obtain the graft copolymers. Then the pressed sheets were made from these graft copolymers and determination of various properties was conducted in the same way as in Example 1. The results are shown in Table 1.

Also, the graft efficiency of each of the graft copolymers obtained in Examples 2–4 was determined by the method described in Example 1. The results are shown in Table 1.

The melt index (at 260° C. and under 10 kg) of the graft copolymers obtained in Examples 3 and 4 was 81.1 g/10 min and 15.3 g/10 min, respectively.

EXAMPLE 5

An oligomer having carboxyl group at one terminal of the molecule was synthesized by using the same method as Example 1. 0.4 mol of benzoic acid, 1.2 mol of p-hydroxybenzoic acid and 1.32 mol of acetic anhydride were supplied and subjected to acetylation and polycondensation treatments.

The obtained oligomer was washed with methanol and dried in vacuo in the same way as Example 1 to obtain a purified oligomer. The flow temperature of this purified oligomer was 202° C. and the number-average degree of polymerization as measured by GPC was n=3.9 in the formula shown in Example 1. The Q value was 1.46. Also, this oligomer showed optical anisotropy in a melting state.

Determination of the number-average degree of polymerization of said oligomer according to the chemical decomposition method described in Example 1 showed n=4.8 in the above-shown formula.

This purified oligomer and the ethylene-methyl acrylate-glycidyl methacrylate terpolymer used in Example 1 were melt mixed at a weight ratio of ethylene-methyl acrylate-glycidyl methacrylate terpolymer/said purified oligomer/triphenylphosphine of 90/10/0.1 (=45 g/5 g/50 mg) under the same conditions as in Example 1 to obtain a graft copolymer. This graft copolymer was worked into a pressed sheet and various properties were determined in the same way as Example 1. The results are shown in Table 1.

EXAMPLE 6

The ethylene-methyl acrylate-glycidyl methacrylate terpolymer used in Example 1 and the aromatic oligomer having carboxyl group at one terminal of the molecule used in Example 5 were mixed at a ratio of ethylene-methyl acrylate-glycidyl methacrylate terpolymer-/aromatic oligomer/triphenylphsophine=90 wt %/10 wt %/0.1 phr and reacted 5 times repeatedly by using a 30 mm twin-screw extruder PCM-30 mfd. by Ikegai Ironworks Co., Ltd., at cylinder temperature of 290° C., screw rotation speed of 200 r.p.m. and feed rate of 3 kg/hr (residence time: about one minute) to obtain a graft copolymer.

This graft copolymer was worked into a pressed sheet and various properties were determined in the same way as Example 1. The results are shown in Table 2.

Further, this graft copolymer was injection molded into a 35 mm×110 mm×2 mm flat sheet by using an injection molding machine IS-25EP-1A mfd. by Toshiba Machinery Co., Ltd., at cylinder temperature of 280° C. The test pieces for determining various properties were cut out from this sheet and subjected to determination of properties in the same way as Example 1. The results are shown in Table 2.

EXAMPLE 7

100 parts of the graft copolymer obtained in Example 6 and 50 parts of carbon black were mixed and melt blended by the twin-screw extruder described in Example 6 under the same conditions as in Example 6 except that the cylinder temperature was changed to 250° C. This graft copolymer composition was press molded and injection molded as described in Example 6 and various properties were determined in the same way as Example 1. The results are shown in Table 2.

EXAMPLE 8

An aromatic oligomer having carboxyl group at one terminal of the molecule was obtained by using the same method as employed in Example 1. 0.3 mol of benzoic acid, 0.6 mol of p-hydroxybenzoic acid, 0.3 mol of m-hydroxybenzoic acid and 1 mol of acetic anhydride were supplied and subjected to the acetylation and polycondensation treatments and the obtained oligomer was pulverized, washed with methanol and dried in vacuo, all in the same ways as practiced in Example 1, to obtain a purified oligomer.

This purified oligomer had a flow temperature of 141° C. and showed optical anisotropy in the melting state.

The degree of polymerization as determined by the chemical decomposition method described in Example 1 was n=7.6 in the following formula. Also, the ratio of para-bonds to meta bonds (p/m) in the hydroxybenzoic acid units was p/m=6.1/1.5.

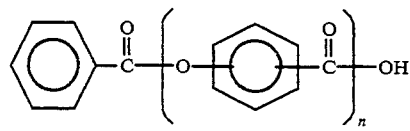

This purified oligomer and the ethylene-methyl acrylate-glycidyl methacrylate terpolymer used in Example 1 were melt mixed at a weight ratio of ethylene-methyl acrylate-glycidyl methacrylate terpolymer/said purified oligomer/triphenylphosphine=86/14/0.1 (=43 g/7 g/50 mg) under the same conditions as in Example 1 to obtain a graft copolymer. A pressed sheet was made from this graft copolymer and various properties were determined in the same way as Example 1. The results are shown in Table 2.

EXAMPLE 9

There was prepared an aromatic oligomer having carboxyl group at one end of the molecule and an aromatic oligomer synthesized by the method described below. 4-mercaptobenzoic acid to be copolymerized with parahydroxybenzoic acid was synthesized according to the thiosalicyclic acid synthesis method by C. F. H. Allen, D. D. McKay et al (described in Org. Synth. p. 580 ff., 1943) and purified by sublimation.

Then, 0.1 mol (15.7 g) of 4-mercaptobenzoic acid, 0.1 mol (13.8 g) of p-hydroxybenzoic acid and 0.1 mol (12.2 g) of benzoic acid were dissolved in 300 ml of pyridine. Separately from this, 0.24 mol (49.44 g) of N,N'-dicyclohexylcarbodiimide and 2.5 g of p-toluenesulfonic acid were dissolved in 200 ml of pyridine, and these solutions were mixed at room temperature.

When the mixed solution was stirred at room temperature, the reaction solution became cloudy in about 5 minutes. After 24-hour stirring, the precipitated aromatic oligomer and N,N'-dicyclohexylurea were filtered out and recovered. The recovered material was washed well with methanol by using a Soxhlet's extractor and dried. There was obtained 21.2 g of an aromatic oligomer.

Elemental analysis of the obtained aromatic oligomer gave the following result: C=65.5 wt. %; H=3.6 wt %; S=9.5 wt %; O=21.1 wt %. It was also determined that this aromatic oligomer had the structure of the following formula:

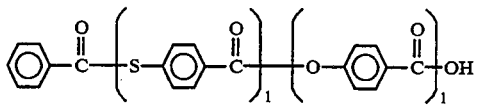

The flow temperature of said aromatic oligomer was 193.1° C. Also, when weight loss on heating of this polymer was measured in the same way as Example 1, it was found that this oligomer was stable to heat up to a temperature close to 280° C. Also, this oligomer showed optical anisotropy in the melting state.

2.5 g of said aromatic oligomer, 2.5 g of the aromatic oligomer used in Example 1, 45 g of the ethylene-methyl acrylate-glycidyl methacrylate terpolymer used in Example 1 and 100 mg of tri-p-tolylphosphine were melt mixed and reacted by using the mixer described in Example 1 at 270° C. and 120 r.p.m. for 5 minutes to obtain a graft copolymer.

By using this graft copolymer, a pressed sheet was made in the same way as Example 1, and a test piece for testing compression set was cut out from said sheet and its compression set was determined after 70 hours at 100° C. It was 62.5%.

EXAMPLE 10

An aromatic oligomer having carboxyl group at one terminal of the molecule was synthesized by using the same method as employed in Example 9. First, 0.2 mol (31.4 g) of 4-mercaptobenzoic acid and 0.1 mol (12.2 g) of benzoic acid were dissolved in 300 ml of pyridine. Separately from this, 0.24 mol (49.44 g) of N,N'-dicyclohexylcarbodiimide and 2.5 g of p-toluenesulfonic acid were dissolved in 200 ml of pyridine, and these solutions were mixed at room temperature.

This reaction solution was stirred for 24 hours and then it was filtered, washed with methanol and dried in the same way as Example 9 to obtain an aromatic oligomer. Elemental analysis of the obtained aromatic oligomer showed C=63.2 wt %, H=3.7 wt %, S=18.8 wt % and O=13.9 wt %. It was also confirmed that said oligomer had a structure of the following formula:

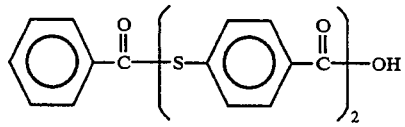

The flow temperature of said aromatic oligomer was determined to be 195.0° C. Also, said oligomer showed optical anisotropy in the melting state.

5 g of said aromatic oligomer, 4 g of the ethylene-methyl acrylate-glycidyl methacrylate terpolymer used in Example 1 and 50 mg of tri-p-tolylphine were melt mixed and reacted by using the mixer described in Example 1, at 280° C. and 120 r.p.m. for 4 minutes to obtain a graft copolymer.

This graft copolymer was press molded in accordance with Example 1 and its compression set (after 22 hours at 70° C.) was determined. It was 39.8%.

The graft copolymers obtained in Examples 1–10 were insoluble in chloroform which is a good solvent of the ethylene-methyl acrylate-glycidyl methacrylate copolymer constituting said graft copolymers.

EXAMPLE 11

ESPRENE ® E-301A (ethylene: 46 wt %; propylene: 49 wt %; dicyclopentadiene: 5 wt %; iodine value: 10) produced by Sumitomo Chemical Industries Co., Ltd. was used as an ethylene-propylene-diene monomer terpolymer (hereinafter referred to as EPDM). 330 g of EPDM and 3,000 ml of toluene were supplied into a 5,000 ml separable flask equipped with a Teflon-made agitating element, a 500 ml dropping funnel and a Dimroth condenser. A Teflon sheet cut to an appropriate shape and size was used as packing disposed between the upper and lower portions of the flask. Cooling water was passed into the Dimroth condenser and the flask was placed in a 100° C. oil bath to start heating, causing dissolution of EPDM.

After EPDM has been completely dissolved, the separable flask was raised out of the oil bath and cooled to room temperature. Then a solution prepared by dissolving 0.15 mol (25 g) of methachloroperbenzoic acid in 500 ml of toluene was added dropwise into the flask from the dropping funnel over a period of one hour. After 12-hour reaction at room temperature, the reaction mixture was diluted with acetone till a moment before occurrence of precipitation of EPDM. (The amount of acetone required for this was about 500 ml). Then the solution was poured into 30 litres of acetone with stirring, causing precipitation of the polymer. The obtained crude product was again dissolved in 3,000 ml of toluene under heating and then again precipitated in acetone to purify the polymer. The obtained epoxidated EPDM was air dried and then dried in vacuo There was obtained 300 g of epoxidated EPDM in a yield of 90%.

The epoxy equivalent of said epoxidated EPDM was determined by back titration. It was found as a result that the epoxy equivalent of the obtained epoxyidated EPDM was 5,000.

An aromatic oligomer having an acid anhydride group at one terminal of the molecule was synthesized in the following way. 0.8 mol (110.4 g) of p-hydroxybenzoic acid and 0.88 mol (90 g) of acetic anhydride were supplied into a 500 ml separable flask furnished with an anchor shaped agitator, a three-way stop-cock and a Dimroth condenser. A properly cut Teflon sheet was used as packing between the upper and lower portions of the flask. The anchor shaped agitator was turned at 120 r.p.m. and nitrogen was introduced into the flask through the three-way stop-cock to create a nitrogen atmosphere in the system while cooling water was flown into the Dimroth condenser. Under this state, the separable flask was placed in an oil bath and the latter was heated to 160° C. With the oil bath kept at 160° C., the acetylation reaction was performed for 2 hours while refluxing acetic anhydride. After the end of the acetylation reaction, the oil bath was cooled for preventing evaporation of acetic acid. Then 0.4 mol (76.8 g) of trimellitic acid anhydride was quickly added, the Dimroth condenser was quickly replaced with a Liebig's condenser and the oil bath was heated to 260° C. Thereafter the oil bath temperature was maintained at 260° C. and acetic acid and acetic anhydride distilled out from the system were recovered by the Liebig's condenser. Recovery of acetic acid, etc. was started just after replacement of the Dimroth condenser with a Liebig's condenser, and polycondensation was terminated at a point when 98.2 g of acetic acid, etc. was recovered in about one hour.

After the end of polycondensation, the oligomer was taken out and pulverized by a pulverizer. There was obtained 142 g of powder. This powder was washed with 5 times as much amount (710 g) of dehydrated acetone in the manner described below to remove the low-molecular weight component soluble in acetone. 142 g of said powder and 710 g of dehydrated acetone were supplied into a 2-litre separable flask. This flask was provided with an anchor shaped agitator and a Dimroth condenser and placed in an 80° C. oil bath in a way that acetone could be refluxed in the system. The reaction mixture was washed under acetone reflux for one hour. Upon end of washing, the reaction solution was filtered and the oligomer was recovered. The recovered oligomer was dried in a vacuum drier at 80° C. for 10 hours to obtain an aromatic oligomer having acid anhydride group at one terminal of the molecule. There was obtained 98 g of said oligomer in a yield of 69%.

The flow temperature of this purified oligomer was 177° C. Then weight loss on heating of this purified oligomer was measured by using a stand-alone thermogravimeter TGA-50 mfd. by Shimadzu Corp. in a nitrogen atmosphere at a heating rate of 10° C./min. From this, it was found that said purified oligomer was stable to heat up to a temperature close to 280° C. Also, said oligomer showed optical anisotropy in the melting state.

In order to confirm that said purified oligomer is terminated at one end of its molecule with an anhydride derived from the trimellitic acid anhydride, the IR absorption spectrum of the oligomer was analyzed according to the KBr method. As a result, there was confirmed absorption due to an acid anhydride at a wave number close to 1783 cm$^{-1}$, which indicated that one thermal of the molecule of said oligomer was an acid anhydride.

Next, the method used for estimating the number-average degree of polymerization of said purified oligomer is described.

According to the preparation method for p-hydroxybenzoic acid oligomer having carboxyl group at one terminal of the molecule described in Example 1, the aromatic oligomers were synthesized at benzoic acid/p-hydroxybenzoic acid molar ratios of ½ to ¼, and the flow temperature was measured.

Further, each aromatic polymer was decomposed into N-n-butylbenzamide, N-n-butyl-p-hydroxybenzamide and p-hydroxybenzoic acid with n-butylamine in N-methylpyrrolidone, and each of the decomposed components was quantified by high-performance liquid chromatography according to the conventional method to determine the number-average molecular weight. As a result, it was found that there exists the following relationship between the aromatic oligomer having carboxyl group at one terminal of the molecule with the number-average degree of polymerization n represented by the following formula and the flow temperature (FT$_{(n)}$) of said aromatic oligomer.

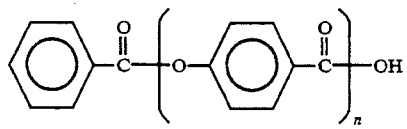

$$FT_{(n)} (°C.) = 32n + 50$$

When the number-average degree of polymerization is estimated by applying the above relationship to the reactive oligomer represented by the following formula obtained from the above synthesis, n=3.97 is given:

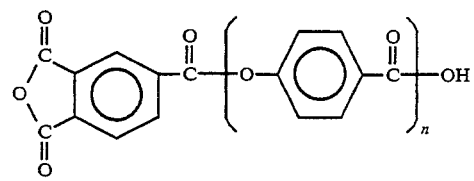

The above-described epoxidated EPDM and the aromatic oligomer having trimellitic acid anhydride group at one terminal of the molecule and represented by the above-shown formula were mixed at a weight ratio of epoxidated EPDM/said aromatic oligomer=40 g/10 g by Laboplastomill R-20 mfd. by Toyo Seiki Seisakusho, Ltd. equipped with a R-60 mixer and a roller type blade, at 150° C. and 200 r.p.m. for one minute. The resulting mixture was further subjected to melt mixing by said Plastomill at 200° C. and 200 r.p.m. for 3 minutes to obtain a graft copolymer. The melt index of the thus obtained graft copolymer at 260° C. under a load of 10 kg was 3.0 g/10 min.

This graft copolymer was worked into a 2.1 mm thick pressed sheet at 260° C. under a pressure of 50 kg/cm$^2$, and a test piece for compression set was cut out from said sheet and its compression set was measured after 22 hours at 70° C. Also, a tensile test piece and a Shore hardness test piece were cut out from said pressed sheet and 100% modulus, ultimate elongation, breaking strength, permanent set and Shore hardness were measured. The results are shown in Table 3.

EXAMPLE 12

150 g of EPDM (double bonds: 0.06 equivalent) and 3,000 ml of hexane were supplied into a 5,000 ml separable flask furnished with a Teflon-made agitator, a nitrogen conduit and a Dimroth condenser. Cooling water was passed into the Dimroth condenser and nitrogen was introduced into the flask from the nitrogen conduit at a rate of 30 ml/min. In this state, the flask was placed in an 80° C. oil bath and heating was started to dissolve EPDM. After EPDM has been completely dissolved, heating was further continued under reflux for 2 hours to effectuate deaeration.

Then 0.12 mol (17.2 g) of glycidyl methacrylate and 0.12 mol (15.2 g) of butyl acrylalte were added, followed by further addition of a solution prepared by dissolving 0.0032 mol (0.80.g) of azobis(2,4-dimethylvaleronitrile) in 20 ml of hexane. After 10-hour reaction at the hexane refluxing temperature, the reaction solution was diluted with acetone till a moment before EPDM was precipitated. (The amount of acetone required for this dilution was about 300 ml.) This solution was poured into 30 litres of acetone with stirring, causing precipitation of the polymer. The obtained crude product was again dissolved in 3,000 ml of toluene under heating and again precipitated in acetone to purify the polymer. The obtained epoxidated EPDM was air dried and then dried in vacuo. There was obtained 120 g of epoxidated EPDM. The yield was 80%.

The epoxy equivalent of this glycidyl-modified EPDM was determined in the same way as Example 11, finding it was 3070.

The aromatic oligomer having carboxyl group alone at one terminal of the molecule was treated according to the same process as described in Example 1 except that benzoic acid/p-hydroxybenzoic acid=0.4/1.0 (by mol), and that 1.1 mol of acetic anhydride was used. The flow temperature of the purified oligomer after washing with methanol was 195° C. Also, said oligomer showed optical anisotropy in the melting state.

The above-described glycidyl-modified EPDM, aromatic oligomer having carboxyl group alone at one terminal of the molecule and tri-p-tolylphosphine used as catalyst were melt mixed at a ratio of glycidyl-modified EPDM/aromatic oligomer/tri-p-tolylphosphine=40 g/10 g/0.05 g (by weight) by Laboplastomill R-60 mfd. by Toyo Seiki Seisaku-sho, Ltd., equipped with a R-60 mixer and a roller type blade, at 230° C. and 200 r.p.m. for 3 minutes. The melt index of the thus obtained graft copolymer at 260° C. under a load of 10 kg was 0.5 g/10 min.

This graft copolymer was worked into a 2.1 mm thick pressed sheet at 260° C. under a pressure of 50 kg/cm$^2$, and the test pieces for determining various properties were cut out from said pressed sheet and subjected to determination of properties. The results are shown in Table 3.

EXAMPLE 13

A graft copolymer was obtained in the same way as Example 12 except that the glycidyl-modified EPDM/aromatic oligomer/tri-p-tolylphosphine weight ratio was changed to 40 g/10 g/0.01 g. A pressed sheet was made from said graft copolymer and determination of various properties were conducted in the same way as Example 11. The results are shown in Table 3.

The graft copolymers obtained in Examples 11-13 were insoluble in toluene which is a good solvent of EPDM, epoxidated EPDM and glycidyl-modified EPDM used in this Example.

Comparative Example 2

A pressed sheet was prepared in the same way as Example 11 from the ethylene-propylene-dicyclopentadiene terpolymer, and the test pieces for determining various properties were cut out from said pressed sheet and subjected to determination of properties. The results are shown in Table 3.

EXAMPLE 14

As an amino-modified organopolysiloxane, there was used BY16-872 (amino equivalent: 2000) by Toray Dow Corning Silicone Co., Ltd., which has the structure represented by the following formula:

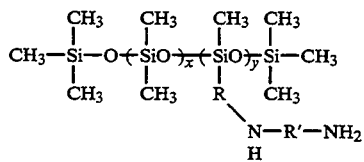

As an aromatic oligomer having acid anhydride group at one terminal of the molecule, there was used the aromatic oligomer used in Example 11.

Then, a reaction was carried out by using said amino-modified polysiloxane and aromatic oligomer having acid anhydride at one terminal of the molecule. 25.0 g of said modified polysiloxane, 9.8 g of said aromatic oligomer, 3.9 mg of lithium chloride and 80 ml of 1-methyl-2-pyrrolidone (NMP) were supplied into a 300 ml separable flask equipped with an anchor shaped agitator, a three-way stop-cock and a Dimroth condenser. Nitrogen was introduced into the separable flask through the three-way stop-cock and the flask was placed in an oil bath in a manner that NMP could reflux in the system in the nitrogen stream. The mixture in the flask was stirred. 3 hours later, the separable flask was taken out of the oil bath and allowed to cool by itself and the solvent was decanted. The resulting product was washed twice repeatedly, for one hour each time, under reflux with methanol. Washing was followed by filtration and the produced graft copolymer was recovered. Further, this recovered product was dried in a vacuum drier at 100° C. to obtain a copolymer having an aromatic oligomer grafted to an organopolysiloxane.

This graft copolymer was worked into a 2.1 mm thick pressed sheet at 250° C. under a pressure of 50 kg/cm$^2$, and a test piece for determining compression set was cut out from said pressed sheet and subjected to determination after 22 hours at 70° C. The permanent compression set was 88.0%. The Shore hardness was 15 and MI of said graft copolymer at 260° C. and under a load of 10 kg was 0.21 g/1 min.

EXAMPLES 15–18

An ethylene-methyl acrylate-glycidyl methacrylate terpolymer (ethylene/methyl acrylate/glycidyl methacrylate=35/63/2 (by weight); MI at 190° C. and under a load of 2.16 kg=8.7 g/10 min) was obtained according to the process described in Japanese Patent Application Kokai (Laid-Open) No. 61-127709, Example 5. This polymer is called EMA-1.

100 parts by weight of EMA-1 and 3 parts by weight of dicumyl peroxide were mixed by a Banbury mixer at 150° C. for 10 minutes to obtain a partially crosslinked sample. This polymer is called EMA-2.

Then, an aromatic oligomer having carboxyl group at one terminal of the molecule was synthesized according to Example 1.

The above-described EMA-1, EMA-2 and aromatic oligomer having carboxyl group at one terminal of the molecule were melt mixed and reacted along with triphenylphosphine at the weight ratios shown in Table 4 (the total weight being 50 g) by using Laboplastomill ME-15 mfd. by Toyo Seiki Seisaku-sho, Ltd., adapted with a R-60 mixer and a roller type blade, in a nitrogen atmosphere at 280° C. and 120 r.p.m. for 10 minutes to obtain a graft copolymer. The melt index of the obtained graft copolymer (at 232° C. and under a load of 10 kg) is shown in Table 4.

This graft copolymer was worked into a 2.1 mm thick pressed sheet at 280° C. under a pressure of 50 kg/cm$^2$, and the test pieces for determining various properties were cut out from said sheet and subjected to determination of properties. The results are shown in Table 4.

EXAMPLES 19–22

An aromatic polyester oligomer having hydroxyl group and carboxyl group reactable with glycidyl group at both ends of the molecule and represented by the following formula was synthesized in the manner described below:

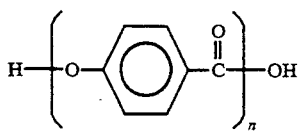

By using the same apparatus as in Example 1, acetylation, polycondensation and methanol washing were performed in the same was as Example 1 except for supply of 1.0 mol (138 g) of p-hydroxybenzoic acid and 0.8 mol (81.6 g) of acetic anhydride.

The flow temperature of the purified oligomer after methanol washing was 250° C. and the number-average degree of polymerization determined from GPC shown in Example 1 was n=6.3 in the above-shown formula. Also, said oligomer exhibited optical anisotropy in the melting state.

EMA-1, the aromatic oligomer having carboxyl group at one terminal of the molecule, which were shown in Example 15, and the above-described aromatic polyester oligomer were melt mixed and reacted along with triphenylphosphine in the weight ratio shown in Table 4 (the total weight being 50 g) by Laboplastomill ME-15 mfd. by Toyo Seiki Seisaku-sho, Ltd., equipped with a R-60 mixer and a roller type blade, in a nitrogen atmosphere at 280° C. and 120 r.p.m. for 10 minutes to obtain a graft copolymer. Property evaluation of the obtained graft copolymer was made in the same way as Example 15. The results are shown in Table 4.

The graft copolymers obtained in Examples 15–22 were insoluble in chloroform which is a good solvent of EMA-1 constituting said graft copolymer.

EXAMPLE 23

A modified polysiloxane having hydrogen atom bonded to silicon, which serves as a reactive functional group, was synthesized in the manner described below.

1.48 mol (440 g) of octamethylcyclotetrasiloxane and 0.55 mol (13.2 g) of 1,3,5,7-tetramethylcyclotetrasiloxane distilled from calcium hydride and purified were supplied into a 1,000 ml three-necked flask equipped with a Dimroth condenser, a three-way stop-cock and an agitator. Then 3.2 g of trifluoromethanesulfonic acid was added and the mixture was stirred in a nitrogen atmosphere at room temperature. 71 hours later, 8.8 g of sodium hydrogencarbonate was added and the mixture was stirred for 3 hours. Then hexane was added and the solids such as unreacted sodium hydrogencarbonate were filtered out from the solution and the residue was dried over anhydrous magnesium sulfate. After filtration, the solvent was distilled away and the residue was dried in vacuo at 80° C. The number-average molecular weight of the obtained modified polysiloxane, as determined by GPC, was 411,635 and its Si—H equivalent as determined by 'H-NMR was 2,329.

Next, a reactive oligomer having unsaturated double bond at one terminal of the molecule was synthesized in the manner described below.

Into a 1,000 ml separable flask equipped with a Dimroth condenser, a dropping funnel and an anchor shaped agitator, 0.78 mol (150 g) of trimellitic acid anhydride and 250 ml of 1,4-dioxane refluxing with lithium aluminum hydride were supplied in a nitrogen atmosphere, and then 0.78 mol (44.6 g) of allylamine was added dropwise from the dropping funnel. After generation of heat has ceased, the reaction mixture was heated at an oil bath temperature of 80° C. for one hour. Then 0.79 mol (80.2 g) of acetic anhydride was added and the mixture was stirred under heating at the refluxing temperature for 2 hours. Thereafter, the solvent was distilled away and the residue was added with 1.2 mol (162 g) of p-hydroxybenzoic acid and 1.3 mol (133 g) of acetic anhydride and treated according to the previously described aromatic oligomer synthesis process to obtain an aromatic oligomer (A) having unsaturated double bond at one terminal of the molecule:

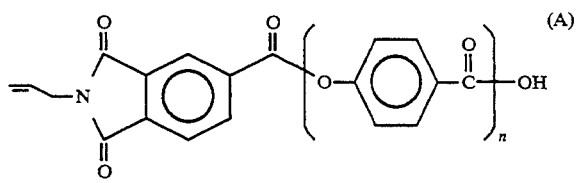

The flow temperature of this oligomer was 162° C. Also, this oligomer showed optical anisotropy in the melting state.

n as determined by the above-described chemical decomposition method using butylamine was 3.8. Further, 135 g of said oligomer (A) and 320 g of triphenyl phosphite were supplied, in a nitrogen atmosphere, into a 1,000 ml separable flask provided with a Dimroth condenser, a three-way stop-cock and an anchor shaped agitator, and the mixture was stirred under heating at an oil bath temperature of 200° C. for 6 hours. After allowed to cool by itself, the mixture was washed with methanol and dried in vacuo at 80° C. to obtain an oligomer phenyl esterified product of the following formula (B):

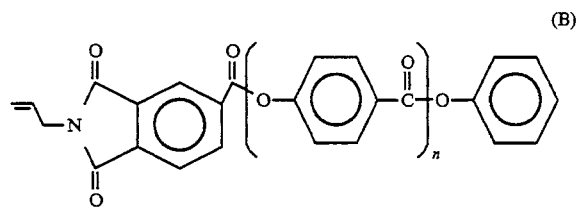

Then, said modified polysiloxane and the aromatic oligomer having unsaturated double bond at one terminal of the molecule (B) were reacted. 19.1 mg of a 1% platinum and carbon mixture with 50% water content was supplied into a 100 ml two-necked flask having a three-way stop-cock, and after the mixture was heated, deaerated and dried, the system atmosphere was replaced with nitrogen. Then 13.0 g of said oligomer (B) was supplied into the system and the latter was subjected to evacuation and nitrogen replacement. 36.2 g of said polysiloxane and the content of the two-necked flask were melt mixed and reacted at 200° C. and 200 r.p.m. for one hour to obtain a rubber-like product.

TABLE 1

| | Unit | Example 1 | Example 2 | Example 3 | Example 4 | Example 5 | Comp. Example 1 |
|---|---|---|---|---|---|---|---|
| Composition | | | | | | | |
| *1 | Parts by weight | 90 | 95 | 80 | 70 | 90 | 100 |
| *2 | Parts by weight | 10 | 5 | 20 | 30 | 10 | 0 |
| Triphenylphosphine | Parts by weight | 0.1 | 0.05 | 0.2 | 0.2 | 0.1 | 0 |
| Graft efficiency | | | | | | | |
| *3 $G_1$ | % | 67 | 89 | 35 | 20 | — | — |
| *3 $G_2$ | % | 84 | 53 | 98 | 97 | — | — |
| Tensile test | | | | | | | |
| 100% modulus | kg/cm$^2$ | 6.5 | 3.4 | 7.1 | 10.9 | 7.1 | 1.8 |
| Elongation at break | % | >600 | >600 | >600 | >600 | >600 | >600 |
| Permanent set | % | 20.0 | 14.0 | 40.0 | 50.0 | 18.0 | 90 |
| Compression set | | | | | | | |
| 70° C., 22 hr. | % | 68.6 | 75.1 | 77.7 | 72.0 | — | 100 |
| 100° C., 70 hr. | % | 70.1 | 76.5 | 82.8 | 70.0 | — | — |
| 150° C., 22 hr. | % | 72.5 | 80.7 | 81.4 | 64.2 | — | — |
| 180° C., 22 hr. | % | — | — | — | — | 45.0 | — |
| Shore hardness | Shore A | 22 | 18 | 23 | 25 | 20 | 13 |

*1: ethylene-methyl acrylate-glycidyl methacrylate terpolymer described in Example 1
*2: aromatic oligomer having carboxyl group at one terminal of the molecule described in Example 1
*3: graft efficiency determined by the method described in Example 1

TABLE 2

| | | Example 6 | | Example 7 | | Example 8 |
|---|---|---|---|---|---|---|
| | | Molding method | | | | |
| | Unit | Press molding | Injection molding | Press molding | Injection molding | Press molding |
| Graft efficiency | | | | | | |
| $G_1$ | % | 75 | — | — | — | 80 |
| $G_2$ | % | 85 | — | — | — | 89 |
| Tensile test | | | | | | |
| 100% modumus | kg/cm$^2$ | 6.3 | 11.2 | 24.3 | 25.2 | 3.7 |
| Elongation at break | % | 700 | 475 | 400 | 350 | 1200 |
| Breaking strength | kg/cm$^2$ | 36.7 | 25.3 | 45.3 | 36.5 | 25.0 |
| Permanent set | % | 20.0 | 10.0 | 30.0 | 35.0 | 40.0 |
| Compression set | | | | | | |
| 100° C., 70 hr. | % | 60.0 | 45.4 | 66.0 | 81.3 | 72.8 |
| 25° C., 22 hr. | % | — | 38.2 | — | 61.4 | — |
| 70° C., 22 hr. | % | — | 51.2 | — | 73.9 | — |
| 100° C., 22 hr. | % | — | 42.1 | — | 76.7 | — |
| 130° C., 22 hr. | % | — | 31.1 | — | 77.8 | — |
| 160° C., 22 hr. | % | — | 47.8 | — | 80.9 | — |
| 180° C., 22 hr. | % | — | 66.3 | — | 93.5 | — |
| 200° C., 22 hr. | % | — | 94.7 | — | — | — |
| Shore hardness | Shore A | 22 | 23 | 44 | 45 | 13 |

TABLE 3

| | Example 11 | Example 12 | Example 13 | Comparative Example 2 |
|---|---|---|---|---|
| Compression set*1 (%) | 72.8 | 66.8 | 78.4 | 95.0 |
| MI. (g/10 min) | 3.0*2 | 0.5*2 | 1.31*2 | 3.39*3 |
| Tensile test | | | | |
| 100% modulus (kg/cm$^2$) | 9.87 | 8.26 | 7.70 | 4.35 |
| Permanent set (%) | 10 | 20 | 20 | 130 |
| Elongation at break (%) | 250 | 200 | 400 | 1200 |
| Breaking strength (kg/cm$^2$) | 11.5 | 8.30 | 7.90 | 4.10 |
| Hardness Shore A | 36 | 22 | 23 | 11 |

Condition for *1: 70° C. and 22 hours
Condition for *2: 260° C. and 10 kg
Condition for *3: 230° C. and 2.16 kg

TABLE 4

| | Unit | Example 15 | Example 16 | Example 17 | Example 18 | Example 19 | Example 20 | Example 21 | Example 22 |
|---|---|---|---|---|---|---|---|---|---|
| Composition | | | | | | | | | |
| EMA-1 | Parts by weight | 50 | 0 | 60 | 40 | 90 | 90 | 95 | 95 |
| EMA-2 | Parts by weight | 40 | 90 | 35 | 40 | — | — | — | — |
| *1 | Parts by weight | 10 | 10 | 5 | 20 | 10 | 10 | 5 | 5 |
| *2 | Parts by weight | — | — | — | — | 0.10 | 0.40 | 0.10 | 0.20 |

TABLE 4-continued

|  | Unit | Example 15 | Example 16 | Example 17 | Example 18 | Example 19 | Example 20 | Example 21 | Example 22 |
|---|---|---|---|---|---|---|---|---|---|
| Triphenylphosphine | Parts by weight | 0.1 | 0.1 | 0.1 | 0.1 | 0.1 | 0.1 | 0.1 | 0.1 |
| Tensile test | | | | | | | | | |
| 100% modulus | kg/cm$^2$ | 4.5 | 4.9 | 3.2 | 8.2 | 4.4 | 4.3 | 3.2 | 3.3 |
| Elongation at break | % | >600 | >600 | >600 | >600 | >600 | >600 | >600 | >600 |
| Permanent set | % | 23 | 14 | 25 | 25 | 21 | 18 | 20 | 15 |
| Melt index 232° C., 10 kg load | g/10 min | 2.6 | 1.0 | 4.1 | 2.5 | 3.8 | 3.5 | 4.2 | 4.0 |
| Shore hardness | Shore A | 23 | 24 | 16 | 25 | 23 | 22 | 15 | 17 |
| Compression set | | | | | | | | | |
| 70° C., 22 hr. | % | 38.2 | 39.0 | 52.0 | 60.5 | 58.2 | 55.0 | 51.3 | 50.1 |
| 100° C., 70 hr. | % | 40.0 | 40.5 | 58.1 | 62.3 | 61.3 | 57.1 | 55.6 | 51.3 |
| 150° C., 22 hr. | % | 45.0 | 42.0 | 61.3 | 75.0 | 72.1 | 60.3 | 61.2 | 59.8 |
| 180° C., 22 hr. | % | 71.0 | 74.0 | 78.2 | 80.1 | 89.0 | 83.1 | 85.1 | 85.3 |

1*: aromatic oligomer having carboxyl group at one terminal of the molecule shown in Example 15
*2: aromatic oligomer shown in Example 19

We claim:

1. A thermoplastic graft copolymer comprising, as main chain, a polymer having a glass transition temperature of 10° C. or below and, as side chain, an aromatic oligomer of which the flow temperature defined below is 100° C. or above:

flow temperature: the temperature at which the melt viscosity of the oligomer reaches 48,000 poises when the oligomer is melted by heating at a rate of 4° C./min and extruded from a nozzle of 1 mm in inner diameter and 10 mm in length under a load of 100 kg/cm$^2$, wherein the main chain is selected from the group consisting of acrylic ester polymer, polybutadiene, polyisoprene, polychloroprene, chlorosulfonated polyethylene, styrene-butadiene copolymer and its hydrogenation product, styrene-isoprene copolymer and its hydrogenation product, ethylene-propylene copolymer, ethylene-propylene-diene terpolymer, acrylonitrile-butadiene copolymer and its hydrogenation product, wherein the aromatic oligomer is selected from the group consisting of those represented by the following formulae (II), (III) or (IV):

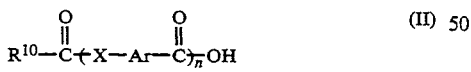

(II)

wherein X is selected from O and S, and the structural units containing O and the structural units containing S may be both contained in an oligomer; $R^{10}$ is an alkyl group having 5 or more carbon atoms or an aryl or aralkyl group having 6 or more carbon atoms: Ar is selected from

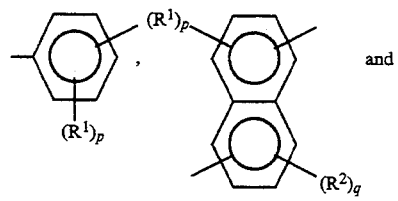

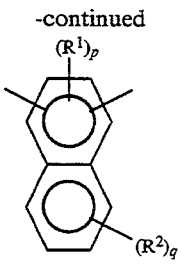

wherein $R^1$ and $R^2$, which may be the same or different, are each selected from an alkyl group having 1–3 carbon atoms or a phenyl group, and different substituents may be attached to the same benzene ring; p and q are each an integer of 0–2; and n is a number average which is 3–8,

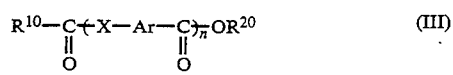

(III)

wherein X is selected from O and S, but the structural units containing O and the structural units containing S may both be contained in one oligomer; when $R^{10}$ is

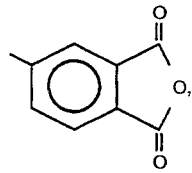

$R^{20}$ is selected from hydrogen, alkyl group having 1–10 carbon atoms and aryl group having 6–20 carbon atoms, and when $R^{20}$ is

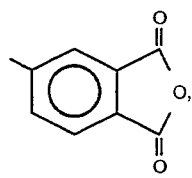

$R^{10}$ is selected from alkyl group 1–10 carbon atoms and aryl group having 6–20 carbon atoms;

Ar, p, q and n are respectively the same as those defined in (II),

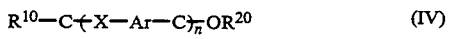

wherein X is selected from O and S; Ar is a divalent arylene group; when $R^{10}$ is a functional group with radical reactivity, $R^{20}$ is selected from hydrogen, alkyl group having 1–10 carbon atoms and aryl group having 6–20 carbon atoms, and when $R^{20}$ is a functional group with radical reactivity, $R^{10}$ is selected from alkyl group having 1–10 carbon atoms and aryl group having 6–20 carbon atoms; and n is a number average, which is 3–8, and the functional group with radical reactivity is that of the following formula:

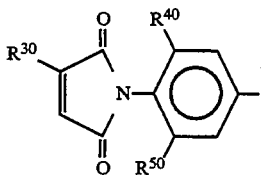

wherein $R^{30}$, $R^{40}$ and $R^{50}$ are each selected from hydrogen and alkyl group having 1–4 carbon atoms.

2. A thermoplastic graft copolymer according to claim 1, wherein the main chain is ethylene-methyl acrylate-glycidyl methacrylate terpolymer.

3. A thermoplastic graft copolymer according to claim 1, wherein the aromatic oligomer shows the liquid crystallinity in the melting state at a temperature in the range from 130° C. to 470° C.

4. A thermoplastic graft copolymer according to claim 1, wherein the sum of the contents of monomer and dimer in the aromatic oligomer is 5% by weight or less of the whole aromatic oligomer.

5. A thermoplastic graft copolymer according to claim 1, of which the compression set (measured according to JIS K-6301 after 22 hours at 70° C.) is 90% or less.

6. A thermoplastic graft copolymer according to claim 1, of which the Shore D hardness is 50 or less.

7. A thermoplastic graft copolymer according to claim 1, of which the permanent set is 50% or less.

8. A thermoplastic graft copolymer according to claim 1, of which the ultimate elongation at 23° C. is 100% or more.

9. A thermoplastic graft copolymer according to claim 1, which is insoluble in good solvents of the polymer having a glass transition temperature of 10° C. or below and constituting said graft, copolymer.

10. A thermoplastic graft copolymer according to claim 1, wherein the polymer having a glass transition temperature of 10° C. or below is not a crystalline polymer.

11. A thermoplastic graft copolymer according to claim 1, wherein the grafted aromatic oligomer forms a physical crosslinkage and shows rubber elasticity.

12. A graft copolymer according to claim 1, wherein the polymer having a glass transition temperature of 10° C. or below and the aromatic polymer having a flow temperature of 100° C. or above are contained in a ratio (by weight) of 99:1 to 50:50.

13. A thermoplastic graft copolymer according to claim 1, wherein the melt index of said graft copolymer measured at a temperature 40°–100° C. higher than the flow temperature of the aromatic oligomer used as side chain and under a load of 10 kg is 0.1 g/10 min or above.

14. A copolymer according to claim 1, wherein the polymer having a glass transition temperature of 10° C. or below is partially crosslinked.

15. A process for preparing a thermoplastic graft copolymer of claim 1, characterized by graft-reacting a polymer having a glass transition temperature of 10° C. or below with an aromatic oligomer having a flow temperature of 100° C. or above.

16. A process for preparing a thermoplastic graft copolymer according to claim 15, characterized by grafting an aromatic oligomer containing 50% by weight or more of the structural units represented by the following formula (I):

wherein X is selected from O and S, and the structural units containing O and the structural units containing S may both be contained in one oligomer; and Ar is selected from

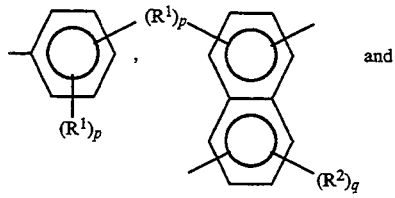

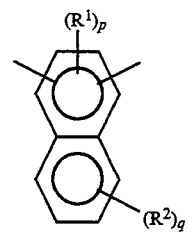

wherein $R^1$ and $R^2$ are each selected from alkyl group of 1–3 carbon atoms and phenyl group; $R^1$ and $R^2$ may be a same or different groups, and the different groups may be attached to one benzene ring; and p and q are each an integer of 0–2.

17. The process for preparing a thermoplastic graft copolymer according to claim 15, wherein the graft reaction is effectuated by melt mixing.

18. The processing for preparing a thermoplastic graft copolymer according to claim 17, wherein the temperature at which melt mixing is performed is higher than the flow temperature of the aromatic oligomer.

19. The process for preparing a thermoplastic graft copolymer according to claim 15, wherein a polymer having a glass transition temperature of 10° C. or below and an aromatic polymer having a flow temperature of 100° C. or above are graft reacted in a ratio (by weight) of 99:1 to 50:50.

20. The process for preparing a thermoplastic graft copolymer according to claim 15, wherein a polymer having a glass transition temperature of 10° C. or below and having a reactive functional group and an aromatic oligomer having a functional group reactable with the functional group of said polymer at one terminal of the molecule are graft reacted by melt mixing them at a temperature above the flow temperature of the aromatic oligomer used.

21. The process for preparing a thermoplastic graft copolymer according to claim 15, wherein a polymer having a glass transition temperature of 10° C. or below, which has at least one functional group selected from the group consisting of epoxy group, amino group, hydroxyl group, carboxyl group, thiol group, isocyanate group, halogen, alkylsilyl ether group, silyl halide group, acid anhydride group and groups having unsaturated double bond, is graft reacted with an aromatic oligomer having a flow temperature of 100° C. or above, which has at least one functional group reactable with the functional group of said polymer and selected from the group consisting of epoxy group, hydroxyl group, carboxyl group, thiol group, halogen, alkylsilyl ether group, silyl halide group, acid anhydride group and groups having unsaturated double bond.

22. The process for preparing a thermoplastic graft copolymer according to claim 21, wherein a polymer having at least one functional group selected from the group consisting of epoxy group, amino group and isocyanate group is graft reacted with an aromatic oligomer having carboxyl group at one terminal of the molecule.

23. The process for preparing a thermoplastic graft copolymer according to claim 21, wherein a polymer having at least one functional group selected from the group consisting of epoxy group and amino group is graft reacted with an aromatic oligomer having acid anhydride group at one terminal of the molecule.

24. The process for preparing a thermoplastic graft copolymer according to claim 15, wherein a polymer having radical reactivity and an aromatic oligomer having radical reactivity at one terminal of the molecule are graft reacted in the presence of a radical initiator.

25. The process for preparing a thermoplastic graft copolymer according to claim 21, wherein a polymer having unsaturated double bond is graft reacted with an aromatic oligomer having a functional group reactable with the unsaturated double bond at one terminal of the molecule.

26. The process for preparing a thermoplastic graft copolymer according to claim 15, wherein the number-average degree of polymerization of the aromatic oligomer is 2–10.

27. The process for preparing a thermoplastic graft copolymer according to claim 15, wherein the number-average degree of polymerization of the aromatic oligomer is 3–8.

28. The process for preparing a thermoplastic graft copolymer according to claim 15, wherein the aromatic oligomer shows liquid crystallinity in the melting state at a temperature in the range from 130° C. to 470° C.

29. The process for preparing a thermoplastic graft copolymer according to claim 15, wherein the sum of the contents of monomer and dimer in the aromatic oligomer is 5% by weight or less.

30. An elastomer containing a thermoplastic graft copolymer according to claim 1.

31. An automobile material comprising an elastomer according to claim 30.

* * * * *